United States Patent
Tompkin et al.

(10) Patent No.: US 10,759,212 B2
(45) Date of Patent: Sep. 1, 2020

(54) SECURITY ELEMENT

(71) Applicants: LEONHARD KURZ Stiftung & Co. KG, Furth (DE); OVD Kinegram AG, Zug (CH)

(72) Inventors: Wayne Robert Tompkin, Baden (CH); Harald Walter, Horgen (CH); Rainer Stahl, Nuremberg (DE); Rouven Spiess, Arth (CH); Rene Staub, Hagendorn (CH)

(73) Assignees: LEONHARD KURZ Stiftung & Co. KG, Furth (DE); OVD Kinegram AG, Zug (CH)

( * ) Notice: Subject to any disclaimer, the term of this patent is extended or adjusted under 35 U.S.C. 154(b) by 19 days.

(21) Appl. No.: 15/527,569

(22) PCT Filed: Dec. 2, 2015

(86) PCT No.: PCT/EP2015/078279
§ 371 (c)(1),
(2) Date: May 17, 2017

(87) PCT Pub. No.: WO2016/087485
PCT Pub. Date: Jun. 9, 2016

(65) Prior Publication Data
US 2018/0134065 A1    May 17, 2018

(30) Foreign Application Priority Data
Dec. 4, 2014   (DE) .................. 10 2014 117 877

(51) Int. Cl.
*B42D 25/364*   (2014.01)
*G02F 1/1334*   (2006.01)
(Continued)

(52) U.S. Cl.
CPC ......... *B42D 25/364* (2014.10); *B42D 25/324* (2014.10); *B42D 25/328* (2014.10);
(Continued)

(58) Field of Classification Search
CPC .. B42D 25/364; B42D 2033/26; G02F 1/1334
See application file for complete search history.

(56) References Cited

U.S. PATENT DOCUMENTS 5,566,892 A    10/1996 Creehan
5,680,185 A *  10/1997 Kobayashi ............ G02F 1/1334
                                                                349/88
(Continued)

FOREIGN PATENT DOCUMENTS

CA       2707728       6/2009
CN    101903183 A     12/2010
(Continued)

OTHER PUBLICATIONS

WO-2013013807-A1 English Translation (Year: 2013).*
Japanese Office Action dated Oct. 1, 2019.

*Primary Examiner* — Kyle R Grabowski
(74) *Attorney, Agent, or Firm* — Hoffman & Baron, LLP

(57) ABSTRACT

The invention relates to a security element (1), a security document (2) with at least one security element (1), a transfer foil (3) with at least one security element (1) as well as a method for producing a security element (1), wherein the security element has at least one layer (11) that is electrically alterable in its optical effect. It is here provided that the at least one layer (11) that is electrically alterable in its optical effect has liquid crystals (12) that can be oriented in an electric field, wherein the at least one layer (11) that is electrically alterable in its optical effect has rod-shaped dye molecules (13), and the orientations of the longitudinal axes (14) of the rod-shaped dye molecules (13) are alterable depending on the orientations of the longitudinal axes (16)

(Continued)

of the spatially adjacent liquid crystals (12) that can be oriented in the electric field, and/or wherein the liquid crystals (12) that can be oriented in the electric field are formed in such a way that the liquid crystals (12) that can be oriented in the electric field simultaneously act as dye molecules.

46 Claims, 14 Drawing Sheets

(51) Int. Cl.
| | |
|---|---|
| *B42D 25/405* | (2014.01) |
| *B42D 25/324* | (2014.01) |
| *B42D 25/351* | (2014.01) |
| *B42D 25/328* | (2014.01) |
| *B42D 25/391* | (2014.01) |
| *B42D 25/378* | (2014.01) |
| *G02F 1/1335* | (2006.01) |
| *G02F 1/1343* | (2006.01) |
| *G02F 1/137* | (2006.01) |
| *B42D 25/23* | (2014.01) |
| *B42D 25/29* | (2014.01) |

(52) U.S. Cl.
CPC ......... *B42D 25/351* (2014.10); *B42D 25/378* (2014.10); *B42D 25/391* (2014.10); *B42D 25/405* (2014.10); *G02F 1/137* (2013.01); *G02F 1/1334* (2013.01); *G02F 1/13439* (2013.01); *G02F 1/133504* (2013.01); *B42D 25/23* (2014.10); *B42D 25/29* (2014.10); *G02F 2202/04* (2013.01)

(56) References Cited

U.S. PATENT DOCUMENTS

| | | | |
|---|---|---|---|
| 7,940,340 B2 | 5/2011 | Ludwig et al. | |
| 8,896,501 B2 | 11/2014 | Stahl et al. | |
| 9,323,099 B2 | 4/2016 | Stahl et al. | |
| 2002/0005434 A1 | 1/2002 | Murakami et al. | |
| 2007/0218216 A1 | 9/2007 | Kato et al. | |
| 2008/0198278 A1* | 8/2008 | Ludwig ................ | B42D 25/364 359/245 |
| 2008/0292817 A1 | 11/2008 | Takaku et al. | |
| 2011/0135890 A1 | 6/2011 | Tiller et al. | |
| 2012/0038852 A1 | 2/2012 | Jang et al. | |
| 2012/0156446 A1 | 6/2012 | Brehm et al. | |
| 2014/0160540 A1 | 6/2014 | Hoshino et al. | |
| 2014/0218663 A1* | 8/2014 | Stahl .................... | B42D 25/328 359/290 |
| 2014/0307192 A1 | 10/2014 | Stahl et al. | |
| 2016/0299366 A1* | 10/2016 | Oh ........................ | G02F 1/1334 |

FOREIGN PATENT DOCUMENTS

| | | | |
|---|---|---|---|
| CN | 102574411 A | 7/2012 | |
| CN | 102712201 A | 10/2012 | |
| CN | 103460267 A | 12/2013 | |
| DE | 102011107421 | 1/2013 | |
| EP | 0475117 A2 | 3/1992 | |
| EP | 0634732 | 1/1995 | |
| EP | 0803525 | 10/1997 | |
| JP | H04250427 | 9/1992 | |
| JP | H11142829 | 5/1999 | |
| JP | 200219344 A | 1/2002 | |
| JP | 2003098541 A | 4/2003 | |
| JP | 2011126199 | 6/2011 | |
| WO | WO9836376 | 8/1998 | |
| WO | WO2007003405 | 1/2007 | |
| WO | WO2008083921 | 7/2008 | |
| WO | WO2008110316 | 9/2008 | |
| WO | WO2009043482 | 4/2009 | |
| WO | WO2013004541 | 1/2013 | |
| WO | WO-2013004541 A1 * | 1/2013 | ........... B42D 25/364 |
| WO | WO-2013013807 A1 * | 1/2013 | ........... B42D 25/369 |
| WO | 2013060599 A1 | 5/2013 | |
| WO | 2014130283 A1 | 8/2014 | |

\* cited by examiner

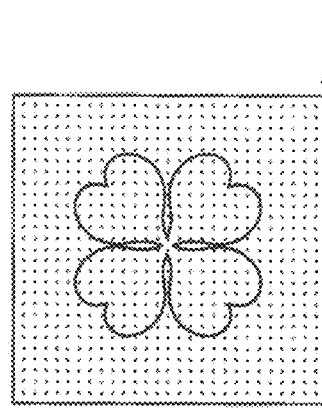
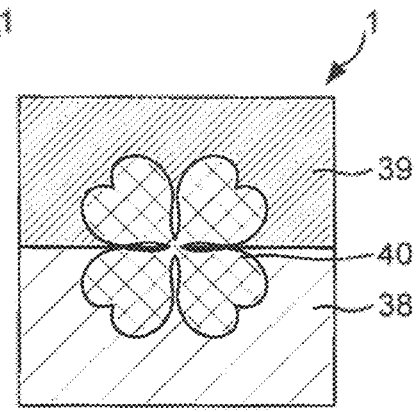
Fig. 15a　　　Fig. 15b
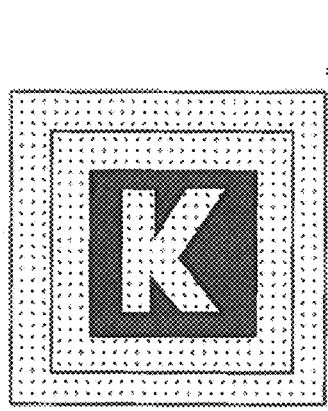
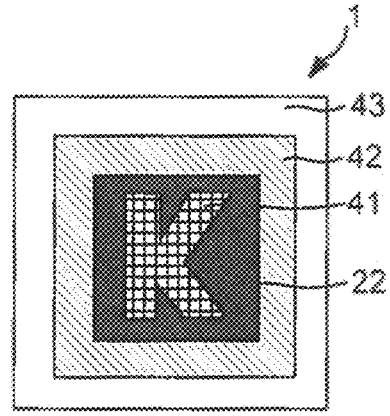
Fig. 15c　　　Fig. 15d
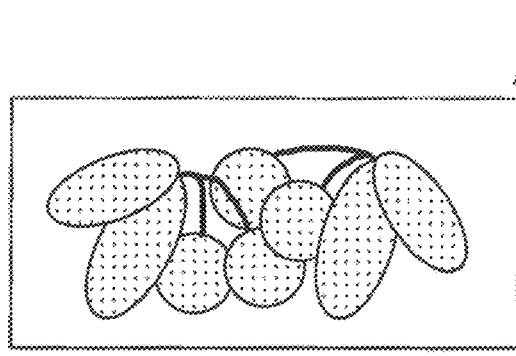
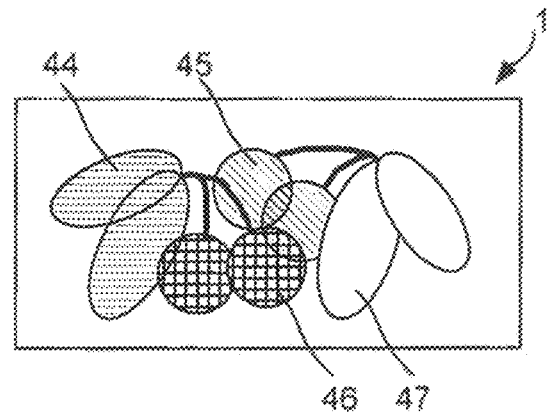
Fig. 15e　　　Fig. 15f

SECURITY ELEMENT

This application claims priority based on an International Application filed under the Patent Cooperation Treaty, PCT/EP2015/078279, filed on Dec. 2, 2015, and German Application No. DE 102014117877.7 on Dec. 4, 2014.

BACKGROUND OF THE INVENTION

The invention relates to a security element, a security document with at least one security element, a transfer foil with at least one security element as well as a method for producing a security element.

Optically active security elements are used in particular on security documents such as for instance banknotes, passports, ID cards, check cards, credit cards, visas or certificates for both information and decorative purposes. Such security elements on the one hand increase protection against forgery, for example vis-à-vis modern color copying and other reproduction systems, and on the other hand can be easily and clearly recognized by the layperson, with the result that the layperson can clearly determine the authenticity of a security document equipped with such a security element and can thus recognize forgeries or manipulations.

For this purpose, security elements can have light-bending, diffractive structures such as for example holograms. These security elements offer the observer striking optically variable effects, for example when the security element is tilted. Optically variable thin-film layer elements which, at different observation angles, give an observer a different color impression for example are also used as security elements. However, such security elements are nowadays to be found on a multitude of security documents, such as for example banknotes, with the result that the layperson hardly notices them in everyday use, whereby forgeries or manipulations are less frequently recognized by laypeople in particular.

SUMMARY OF THE INVENTION

The object of the invention is now to provide an optically variable security element with an improved optical appearance.

This object is achieved by a security element for marking a security document, in particular a banknote or an ID document, with an upper side and an underside, wherein the security element has at least one layer that is electrically alterable in its optical effect, in which the at least one layer that is electrically alterable in its optical effect has liquid crystals that can be oriented in an electric field, wherein
a) the at least one layer that is electrically alterable in its optical effect further has rod-shaped dye molecules, and furthermore the orientations of the longitudinal axes of the rod-shaped dye molecules are alterable depending on the orientations of the longitudinal axes of the spatially adjacent liquid crystals that can be oriented in the electric field, and/or
b) the liquid crystals that can be oriented in the electric field are formed in such a way that the liquid crystals that can be oriented in the electric field simultaneously act as dye molecules.

This object is further achieved by a security document, in particular a banknote or an ID document, with at least one security element according to one of claims 1 to 46. This object is also achieved by a transfer foil with at least one security element according to one of claims 1 to 46, wherein the at least one security element is detachably arranged on a carrier film of the transfer foil. It is also possible for the security element to be integrated into a laminating film. This object is further achieved by a method for producing a security element according to one of claims 1 to 46, wherein the at least one layer that is electrically alterable in its optical effect is formed by printing, preferably onto a carrier film or a layer or layer stack applied to a carrier film.

It has been shown here that the contrast between a more opaque and/or colored state of the layer that is electrically alterable in its optical effect and a more transparent and/or more weakly colored state of the layer that is electrically alterable in its optical effect, in particular under unfavorable light conditions, is improved by such a security element. This makes it possible to increase the protection against forgery or the recognition rate, in particular for laypeople, of a security document equipped with such a security element. The recognition rate for laypeople is increased, in particular under unfavorable light conditions, by this improvement in contrast. Such an improvement in contrast is achieved without increasing the layer thickness of the layer that is electrically alterable in its optical effect. As a result, such a security element can be used on security documents of small thickness, such as for example banknotes, without the overall impression, usability or durability of the security document being substantially affected by the security element. Furthermore, such a security element can be formed flexible, with the result that the security element can for example be cost-effectively produced as a foil body in a roll-to-roll process. The improvement in contrast is achieved by the liquid crystal molecules in combination with the rod-shaped dye molecules or by the liquid crystals which act simultaneously as dye molecules, wherein the rod-shaped dye molecules or the liquid crystals simultaneously acting as dye molecules have different absorption coefficients for electromagnetic radiation, in particular in the wavelength range of from 380 nm to 780 nm and preferably between 430 nm and 690 nm, for different molecular axes.

The at least one layer that is alterable in its optical effect preferably has different rod-shaped dye molecules as well as different liquid crystals simultaneously acting as dye molecules, which have different absorption spectra and in particular have their absorption maximum at different wavelengths. These thus differ in the chromaticity which they produce for the human eye.

As the longitudinal axes of the rod-shaped dye molecules are alterable depending on the orientations of the longitudinal axes of the spatially adjacent liquid crystals that can be oriented in the electric field, incident light is absorbed by the rod-shaped dye molecules depending on the orientation of the liquid crystal molecules and thus depending on the orientation of the rod-shaped dye molecules. Thus, in addition to the effects which are produced by the liquid crystals, the rod-shaped dye molecules can absorb incident light. Besides the improvement in contrast, the rod-shaped dye molecules have the result that a change takes place between a more opaque, colored state of the layer that is electrically alterable in its optical effect and a more transparent state of the layer that is electrically alterable in its optical effect.

The liquid crystals acting as dye molecules can be oriented in an electric field, like liquid crystals, and simultaneously act as dye molecules, with the result that, depending on the orientation of the liquid crystals simultaneously acting as dye molecules in the electric field, particular wavelengths of incident light are absorbed to different extents, as the liquid crystals simultaneously acting as dye molecules have different absorption coefficients for different molecular axes. The liquid crystals simultaneously acting as dye molecules achieve a change between a more opaque, colored state of the layer that is electrically alterable in its optical effect and a more transparent state of the layer that is electrically alterable in its optical effect.

The change in the intensity of the color arises here due to the different absorption coefficients for different molecular axes of the rod-shaped dye molecules and/or the liquid crystals simultaneously acting as dye molecules as, depending on the rod-shaped dye molecules and/or liquid crystals simultaneously acting as dye molecules used and their orientation to the incident light, particular wavelengths are more strongly absorbed. This further increases the protection against forgery in particular vis-à-vis laypeople, as such changes between a more opaque, colored state and a more transparent state are very memorable for laypeople and therefore have a high recognition value. This change between a more opaque, colored state and a more transparent, more weakly colored state is achieved by the liquid crystals and the rod-shaped dye molecules and/or the liquid crystals simultaneously acting as dye molecules, with the result that no further layers are necessary for this change. The small layer thickness of the layer that is electrically alterable in its optical effect is hereby obtained, with a simultaneous change between a more opaque, colored state and a more transparent, more weakly colored state.

Furthermore, it is also possible to mix different rod-shaped dye molecules in particular with absorption maxima in different wavelength ranges with each other. By adapting the respective mixing ratio it is hereby also possible to set a chromaticity other than that of the pure rod-shaped dye molecules.

Furthermore, it is also possible to mix one or more types of rod-shaped dye molecules with one or more conventional dyes which do not become oriented to the molecular axes of the liquid crystals. This makes it possible, for example in the opaque state of the layer that is electrically alterable in its optical effect, to set a mixed color A which results from the absorption spectra of the respective rod-shaped as well as of the conventional dye molecules. When switching into the more transparent state of the layer that is electrically alterable in its optical effect, only the orientation of the rod-shaped dye molecules is altered, and thus the absorption coefficient thereof at a particular wavelength. The absorption spectrum of the conventional dye molecules is not affected, with the result that a new color B, different from color A, is thereby produced. This color B is dominated by the chromaticity of the conventional dye molecules.

In its more opaque, colored state, the layer that is electrically alterable in its optical effect is relatively impermeable to light, at least to a partial range of the visible spectrum; in the more transparent, more weakly colored state, light can pass through the layer that is electrically alterable in its optical effect better than in the more opaque state. The more opaque state of the layer that is electrically alterable in its optical effect is also referred to as the opaque, switched-off, colored or de-energized state. The more transparent state of the layer that is electrically alterable in its optical effect is also referred to as the transparent, open, more weakly colored or switched-on state. The optical effect of the electrically alterable layer here relates for example to the transmittance, the chromaticity, the optical density, the polarization of the light or the light scattering. By chromaticity is meant here any color which can be represented in a color model such as e.g. the RGB color model (R=red; G=green; B=blue) or the CMYK color model (C=cyan; M=magenta; Y=yellow; K=black) as a color dot within a color space. The layer that is electrically alterable in its optical effect can thus alter the chromaticity under the action of an electric field from a first color dot to a second color dot within a color space. An alteration of the chromaticity can also bring about a change in contrast for example from black to white or from dark green to light green. A change in the chromaticity can also give rise to a change in the transmittance of the layer that is electrically alterable in its optical effect or vice versa.

The transmittance, the chromaticity, the optical density, the polarization of the light or the light scattering of the at least one layer that is electrically alterable in its optical effect can be changed smoothly between two extreme values depending on the voltage applied, e.g. between a minimally translucent and thus a maximally opaque state with no voltage applied and a maximally translucent and thus a maximally transparent state in the case of a particular voltage value other than zero.

Because of their rod shape, the rod-shaped dye molecules become oriented with their longitudinal axes to the longitudinal axes of the spatially adjacent liquid crystals that can be oriented in the electric field. If for example the orientation of the longitudinal axes of the liquid crystals that can be oriented in an electric field is altered by an electric field, the longitudinal axes of the rod-shaped dye molecules become oriented corresponding to the differently oriented longitudinal axes of the liquid crystals that can be oriented in the electric field. The rod-shaped dye molecules here become oriented in particular according to the spatially adjacent liquid crystals. By spatially adjacent is meant here those liquid crystals directly surrounding the corresponding rod-shaped dye molecules. As the spatial extent of the rod-shaped dye molecules along their longitudinal axis is clearly greater than the extent of the rod-shaped dye molecules along their transverse axis and thus their length is clearly greater than their width, the rod-shaped dye molecules have a length-to-width ratio which is different from 1. This ratio is preferably greater than or equal to 2, preferably greater than or equal to 3, and further preferably greater than or equal to 5.

By the term "observation angle" is meant here both the angle at which the at least one layer of the security element that is electrically alterable in its optical effect is observed by an observer and the angle at which the at least one layer of the security element that is electrically alterable in its optical effect is illuminated by an illumination device. By "observation angle" is meant the angle enclosed between the surface normal of the plane spanned by the underside of the security element and the observation direction of an observer. Likewise, by "observation angle" is meant the angle enclosed between the surface normal of the plane spanned by the underside of the security element and the illumination direction of an illumination device. Thus for example at the observation angle of 0° an observer looks at the surface of the security element perpendicularly, and at an observation angle of 70° an observer looks at the security element at a shallow angle. If the observation direction of the observer or the illumination direction of the illumination device changes, the observation angle consequently changes.

Further advantageous embodiments of the invention are referred to in the dependent claims.

Preferably, the orientation efficiency of the longitudinal axes of the rod-shaped dye molecules relative to the longitudinal axes of the liquid crystals that can be oriented in the electric field is between 50% and 100%, preferably between 70% and 100%. The higher the orientation efficiency of the longitudinal axes of the rod-shaped dye molecules relative to the longitudinal axes of the liquid crystals that can be oriented in the electric field, the better the contrast between the more opaque, colored state and the more transparent, more weakly colored state of the at least one layer that is electrically alterable in its optical effect. By "orientation efficiency of the longitudinal axes of the rod-shaped dye molecules relative to the longitudinal axes of the liquid crystals that can be oriented in the electric field" is meant here that percentage of the rod-shaped dye molecules which have the same orientation as the liquid crystals that can be oriented in the electric field. An orientation efficiency of 30% means that, for example, the longitudinal axes of 300 rod-shaped dye molecules out of a total of 1000 rod-shaped dye molecules have the same orientation as the liquid crystals that can be oriented in the electric field.

It is further advantageous if the rod-shaped dye molecules are soluble, non-ionic, chemically, photochemically and/or electrochemically stable dye molecules. This makes it possible to increase the period of use of the security element as, for example, the optical properties of stable dye molecules hardly deteriorate over a long period of use and under different environmental influences.

It is further possible for the rod-shaped dye molecules to be conjugated dye molecules, preferably conjugated, aromatic dye molecules. It is further possible for the rod-shaped dye molecules to be linear, polycyclic, aromatic, conjugated dye molecules. Such dye molecules have suitable absorption properties for light in a wavelength range visible to the human eye, in particular in the wavelength range of from 380 nm to 780 nm.

It is further advantageous if the rod-shaped, conjugated dye molecules have one or more heteroatoms, in particular one or more nitrogen atoms or one or more oxygen atoms. The absorption properties of the rod-shaped dye molecules can be further influenced hereby.

It is further also possible for the rod-shaped dye molecules to have at least one molecule based on an anthraquinone dye and/or an azo dye.

It is further advantageous if the liquid crystals that can be oriented in an electric field, which are formed in such a way that the liquid crystals that can be oriented in the electric field simultaneously act as dye molecules, are molecules from the oligo(p-phenylene-vinylene) (OPV) group, in particular are OPV oligomers. It is advantageous here if the oligomers consist of at least two, preferably three phenylene-vinylene building blocks (dimers or trimers). This allows for a sufficient length-to-width ratio for the property as liquid crystal with orientation-dependent absorption. It is further preferred if the liquid crystals simultaneously acting as dye molecules have a maximum of ten phenylene-vinylene building blocks and in particular only five phenylene-vinylene building blocks (pentamers). This results in a sufficiently low phase transition temperature between the liquid crystal phases, which is compatible with roll-to-roll printing processes.

According to a further preferred embodiment example of the invention, the concentration of the rod-shaped dye molecules in the at least one layer that is electrically alterable in its optical effect is between 0.05 percent by weight and 4 percent by weight, preferably between 0.15 percent by weight and 2.0 percent by weight and particularly preferably between 0.5 percent by weight and 2.0 percent by weight.

Preferably, the rod-shaped dye molecules absorb light in a wavelength range visible to the human eye, preferably in the wavelength range of from 380 nm to 780 nm, further preferably in the wavelength range of from 430 nm to 690 nm, which strikes the longitudinal axis of the rod-shaped dye molecules perpendicularly more strongly than light which strikes parallel to the longitudinal axis of the rod-shaped dye molecules. Because of their rod-shaped form, the dye molecules have an anisotropic absorption such that light the electric field vector of which runs perpendicular to the longitudinal axis of the rod-shaped dye molecules undergoes a lower absorption in the case of a particular wavelength of incident light than light the electric field vector of which does not run perpendicular to the longitudinal axis of the rod-shaped dye molecules. Thus, for example, light which propagates parallel to the longitudinal axis of the rod-shaped dye molecules undergoes lower absorption than light which propagates perpendicular to the longitudinal axis of the rod-shaped dye molecules. By "stronger or weaker absorption along a direction of propagation of the light perpendicular/parallel to the longitudinal axis of the rod-shaped dye molecules or relative to the perpendicular/parallel striking of the longitudinal axis of the rod-shaped dye molecules" is meant here a difference in the absorption of the rod-shaped dye molecules with respect to the perpendicular/parallel direction of propagation of the light or the perpendicular/parallel striking by the light of at least a factor of 2, preferably 4, further preferably 10 and particularly preferably 20. This factor relates to the wavelength with the strongest absorption in the wavelength range of from 380 nm to 780 nm.

It is further possible for the ratio of the light absorbed by the rod-shaped dye molecules which is polarized perpendicular to the longitudinal axis of the rod-shaped dye molecules to absorbed light which is polarized parallel to the longitudinal axis of the rod-shaped dye molecules to be at least 2, preferably at least 4, further preferably at least 10 and particularly preferably at least 20. By means of this anisotropic absorption, the rod-shaped dye molecules can produce a switchable chromaticity. The rod-shaped dye molecules can thus determine the chromaticity of the at least one layer that is electrically alterable in its optical effect, in particular in the more opaque, colored state.

The rod-shaped dye molecules can thus for example produce the colors red, green, magenta, black, cyan, yellow, blue as a color dot within a color space, for example of the CMYK color model.

According to a further embodiment example of the invention, the security element has a support layer.

It is further advantageous that the support layer, seen perpendicularly to the plane spanned by the underside of the security element, at least partially forms a frame around the at least one layer that is electrically alterable in its optical effect, which mechanically reinforces the at least one layer that is electrically alterable in its optical effect. Such a support layer contributes on the one hand to the mechanical stabilization of the at least one layer that is electrically alterable in its optical effect and on the other hand to the standardization of the distance between further layers which the security element has. Here in particular a first and second electrode layer, between which at least a part of the at least one layer that is electrically alterable in its optical effect is arranged, are significant. By means of such a standardization of the distance, the electric field over the region of the at least one layer that is electrically alterable in its optical effect can be kept as constant as possible and the optical effect of the at least one electrically alterable layer can be switched homogeneously.

It is further advantageous if the support layer is formed electrically insulating. An electric short circuit for example between the first electrode layer and the second electrode layer is hereby avoided.

It is further possible that, by means of the support layer, a sealing or optical boundary of the at least one layer that is electrically alterable in its optical effect and/or an optimization of the adhesion of further layers can be achieved.

It is possible for the support layer to form a frame around one or more partial regions of the at least one layer that is electrically alterable in its optical effect. This makes it possible to further mechanically stabilize the at least one layer that is electrically alterable in its optical effect.

The frame preferably forms a visually recognizable design element. A visually recognizable design element can for example be a graphically formed outline, a figurative representation, an image, a motif, a symbol, a logo, a portrait, a pattern, an alphanumeric character, a text and the like.

It is further advantageous if the support layer is formed colored, in particular if the support layer has one or more dyes and/or pigments. It is here also possible for the support layer to be colored in regions. Thus the support layer can be present in regions as an opaque colored support layer and/or in regions as a transparent support layer.

According to a further preferred embodiment example of the invention, the support layer is present in one or more first zones and not present in one or more second zones, wherein the support layer in the one or more first zones has a height of between 1 µm and 50 µm, preferably between 2 µm and 30 µm, further preferably between 3 µm and 20 µm. It has surprisingly been shown that, by means of a support layer formed in this way, the mechanical stability of the at least one layer that is electrically alterable in its optical effect can be further improved.

It is further advantageous that the distance between the one or more first zones is between 5 µm and 500 µm, preferably between 10 µm and 300 µm, further preferably between 20 µm and 150 µm, and that the security element in the one or more second zones has the at least one layer that is electrically alterable in its optical effect. It is hereby possible for the distance in particular between a first and a second electrode layer, between which at least a part of the at least one layer that is electrically alterable in its optical effect is arranged, to be kept constant because of the further mechanical stabilization and the optical effect of the at least one electrically alterable layer is thereby improved, for example as a result of a more homogeneous electric field. In order to achieve a high contrast between a more opaque state of the layer that is electrically alterable in its optical effect and a more transparent state of the layer that is electrically alterable in its optical effect, the layer that is electrically alterable in its optical effect typically has a high proportion of liquid crystals, in particular a proportion of liquid crystals of between 50% and 99%. These liquid crystals are preferably non-crosslinked or only slightly crosslinked, in order to guarantee the mobility required for the switching of the layer that is electrically alterable in its optical effect. The security element hereby becomes soft and thus susceptible to mechanical damage, such as for example indentations. By means of the one or more first zones in which the support layer is present and the one or more second zones in which the security element has the at least one layer that is electrically alterable in its optical effect, the stability of the security element is increased and its susceptibility to mechanical damage is thus reduced.

It is further possible for the distance between the one or more first zones to be constant.

It is further also possible for the distance between the one or more first zones to vary, for example in a uniform grid or also to vary randomly or pseudo-randomly.

The one or more first zones are advantageously arranged according to a one-dimensional or two-dimensional grid.

It is further advantageous that the one or more first zones are formed patterned, in particular for representing a first item of information. A pattern can for example be a graphically formed outline, a figurative representation, an image, a motif, a symbol, a logo, a portrait, an alphanumeric character, a text and the like.

According to a preferred embodiment example of the invention, the security element has a first electrode layer and a second electrode layer, between which at least a part of the at least one layer that is electrically alterable in its optical effect is arranged.

It is particularly preferred if the first electrode layer and the second electrode layer are formed as an upper and lower electrode layer, which are arranged above or below the at least one layer that is electrically alterable in its optical effect. By the position descriptions "upper/above" and "lower/below" is meant here the relative position with respect to an observer of the security element, in particular applied to a substrate such as for example a security document. An upper electrode layer is thus for example arranged closer with respect to an observer than a lower electrode layer. In such a case the first electrode layer corresponds to the lower electrode layer and the second electrode layer corresponds to the upper electrode layer. It is now possible for the first electrode layer and the second electrode layer to be formed perpendicular to the plane spanned by the underside of the security element and for at least a part of the at least one layer that is electrically alterable in its optical effect to be arranged between the first electrode layer and the second electrode layer. When an electric voltage is applied to the first electrode layer and the second electrode layer, an electric field is produced in the space between the two electrodes, which alters the orientation of the liquid crystals that can be oriented in an electric field. The longitudinal axes of the rod-shaped dye molecules vary depending on the orientations of the longitudinal axes of the spatially adjacent liquid crystals that can be oriented in the electric field. The optical effect of the at least one layer that is electrically alterable in its optical effect is thus altered.

For this, the electrodes can be connected to an energy source which produces the electric voltage. The optical effect of the at least one layer that is electrically alterable in its optical effect can be brought about by a deliberate action of a user, e.g. by bending a piezoelectric energy source or actuating a button or another switch element with a thereby triggered application of an electric voltage to the electrodes and/or of an electric or electromagnetic field to the at least one layer that is electrically alterable in its optical effect, or without the deliberate action of a user can be triggered by influences from the environment, e.g. by unconsciously passing through an RF (radio frequency) field, or by the incidence of light on a solar cell with a thereby triggered application of an electric voltage to the electrodes and/or of an electric or electromagnetic field to the at least one layer that is electrically alterable in its optical effect. The solar cell can for example be an organic, in particular flexible, solar cell which can be produced by means of printing technology. Other possible energy sources are for example batteries, capacitors or one or more antenna elements which can generate electric signals by means of external electromagnetic fields acting on the one or more antenna elements, in particular RF fields. These electric signals have the current and/or voltage values necessary for switching the at least one layer that is electrically alterable in its optical effect.

The electric field between the first electrode layer and the second electrode layer preferably has field strengths in the range of from $0.25 \cdot 10^4$ V/cm to $5.0 \cdot 10^4$ V/cm, preferably in the range of from $0.75 \cdot 10^4$ V/cm to $3.5 \cdot 10^4$ V/cm and particularly preferably in the range of from $0.75 \cdot 10^4$ V/cm to $2.5 \cdot 10^4$ V/cm. The electrode layers preferably consist of materials with good electric conductivity of more than $10^{-3}$ S/cm and preferably more than 1 S/cm. It is possible here for the first electrode layer and/or the second electrode layer to be a layer of polyethylene dioxythiophene (PEDOT)/PSS or PANI.

It is further also possible for the first electrode layer and/or the second electrode layer to be a layer of indium tin oxide (ITO). Such layers are transparent, electrically conductive layers.

It is further advantageous that the first electrode layer and/or the second electrode layer is/are transparent or semi-transparent.

It is further also possible for the first electrode layer and/or the second electrode layer to be a thin metal layer of gold, silver, chromium, copper or aluminum, in particular with a layer thickness of between 0.5 nm and 50 nm, or fine wires or filigree lines of the above-named metals in particular with a diameter or width of between 1 µm and 100 µm.

According to a further preferred embodiment example, the first electrode layer and/or the second electrode layer consists of a layer stack with at least two layers, preferably of the above-named materials with good electrical conductivity. For example the first electrode layer and/or the second electrode layer can consist of a double layer, wherein the first layer of this double layer consists of filigree lines of silver or aluminum with a width of e.g. 5 µm and a thickness of the filigree lines of e.g. 30 nm as well as an average distance between the filigree lines of e.g. 200 µm and the second layer of this double layer is a layer, over the entire surface, of polyethylene dioxythiophene PEDOT/PSS with a thickness of e.g. 100 nm. The second layer can alternatively consist of ITO (indium tin oxide).

Advantageously, the first electrode layer and/or the second electrode layer is provided in a first region and not provided in a second region, wherein the first region is formed patterned, in particular is formed for representing a second item of information. A pattern can for example be a graphically formed outline, a figurative representation, an image, a motif, a symbol, a logo, a portrait, an alphanumeric character, a text and the like. Thus it is for example possible for the upper electrode layer to be formed reflective, metalized. It is advantageous here to provide the metalization only in regions, e.g. as filigree lines or other graphic elements with low surface coverage, in order not to limit the visibility of the underlying layers.

According to a further preferred embodiment example of the invention, the first electrode layer has first microstructures in at least one third region.

It is thus possible for the first electrode layer and/or the second electrode layer to consist of several layers, wherein not all of the layers need to have good conductivity. Thus for example the first electrode layer can consist of a replication varnish layer into which first microstructures are molded in at least one third region and of a metal layer which is applied directly to the replication varnish layer at least in regions in the form of a metalization. The metal layer here forms the conductive layer of the first electrode layer and in addition allows the optical effects generated by the first microstructures to emerge clearly.

The at least one third region preferably has one or more partial regions, into which at least two different first microstructures are molded, in particular two first microstructures producing different color effects. It is hereby possible to further increase the protection against forgery of the security element as, for example, several color effects that are different and memorable to an observer are produced in the partial regions. It is possible here for the surface coverage of the individual partial regions to be such that they can be resolved by the naked human eye and/or cannot be resolved by the naked human eye. In particular, in the event that the individual partial regions cannot be resolved by the naked human eye, it is possible that, for a human observer, the individual color effects of the individual partial regions are superimposed in such a way that they produce a mixed color for example according to the RGB color model.

It is further possible for the first electrode layer to have the first microstructures in the one or more second zones in which the support layer is not present and not in the one or more first zones in which the support layer is present.

It is thus possible for the support layer or the one or more first zones of the support layer to form a partial layer of the first electrode layer. Thus for example the one or more first zones of the support layer can be molded into the replication varnish layer of the first electrode layer and first microstructures can be molded into the spaces between the one or more first zones. It is further possible for the first electrode layer to have a metal layer which is applied in the form of a metalization to the replication varnish layer at least in regions and forms the electrically conductive layer of the first electrode layer.

The first microstructures advantageously produce at least one color effect in the range of the wavelengths visible to the human eye, in particular in the wavelength range of from 380 nm to 780 nm.

The first microstructures preferably produce the at least one color effect by light scattering and/or light refraction and/or interference.

According to a further preferred embodiment example of the invention the first microstructures are first diffractive relief structures and/or binary microstructures and/or multi-step microstructures.

It is further advantageous if the first diffractive relief structures are selected from the group of Kinegram®, holograms, zero-order diffraction structures, blazed gratings, in particular asymmetrical saw-tooth relief structures, diffraction structures, in particular linear sinusoidal diffraction gratings or crossed sinusoidal diffraction gratings or linear single- or multi-step rectangular gratings or crossed single- or multi-step rectangular gratings, mirror surfaces, mat structures, in particular anisotropic or isotropic mat structures, or combinations of these structures.

It is further also advantageous that the binary microstructures consist of a base surface parallel to the plane spanned by the underside of the security element and several first elements, wherein first element surfaces of the first elements in each case run substantially parallel to the base plane and wherein the first element surfaces of the first elements and the base surface are spaced apart in a direction running perpendicular to the underside of the security element by a first distance which is selected such that a color is generated, in particular by means of interference of the light reflected on the base surface and the first element surfaces in reflected light and/or in particular by means of interference of the light transmitted through the first element surfaces and the base surfaces in transmitted light. The first distance is preferably between 150 nm and 1500 nm. It is further possible for the binary microstructures to be formed in such a way that they generate the color in the first diffraction order or in scattered light. It is thus possible for the first elements to be formed and arranged in such a way that at least 10% of the incident light, in particular between 20% of the incident light and 90% of the incident light, further preferably between 30% and 70% of the incident light is deflected out of the zero order, in particular it is deflected by scattering or diffraction. It is further possible for at least one lateral extent of the projection of each first element onto the base surface to be between 0.25 µm and 50 µm, preferably between 0.75 µm and 10 µm and/or for the minimum distance between adjacent first elements to be not greater than 300 µm and to be selected in particular between 0.5 µm and 300 µm, preferably between 0.5 µm and 50 µm. It is further possible for the formation and/or positioning of the first elements to be varied in a pseudo-random manner.

It is further advantageous that the binary microstructures consist of a multitude of second elements adjacent to each other, wherein second element surfaces of the second elements are arranged parallel to each other and the second elements have an edge adjacent to the respective second element surface in each case, wherein the second element surfaces of adjacent second elements are spaced apart in a direction perpendicular to the second element surfaces by a second distance, wherein the second distance is between 150 nm and 1500 nm. It is further possible for at least three second elements to be arranged in such a way that the height of the binary microstructures corresponds at least to three times the second distance. The binary microstructures thus have a stepped or stepped pyramid-shaped design. Such binary microstructures are also called multi-step microstructures. It is thus possible for the second elements to follow an envelope curve, wherein the envelope curve has a spatial frequency of between 100 lines/mm and 2000 lines/mm and a height of more than 500 nm. It is further possible for the envelope curve to have an asymmetrical relief profile.

It has here surprisingly been shown that by means of first diffractive relief structures and/or binary microstructures shaped in this way particularly memorable color effects or changes in contrast can be achieved in connection with the at least one layer that is electrically alterable in its optical effect. Thus in particular the color effects of the more opaque state of the layer that is electrically alterable in its optical effect, produced by first diffractive relief structures and/or binary microstructures shaped in this way, are completely covered or obscured. In the case of a change into the more transparent state of the layer that is electrically alterable in its optical effect, the color effects of first diffractive relief structures and/or binary microstructures shaped in this way are clearly recognizable. High-contrast changes can thus be achieved hereby. Thus for example the layer that is electrically alterable in its optical effect can be perceived as a homogeneous, colored, opaque layer, so long as the liquid crystals and the rod-shaped dye molecules are not oriented in an electric field. The effects of the first diffractive relief structures and/or the binary microstructures are covered. If the liquid crystals and the rod-shaped dye molecules becoming oriented to the liquid crystals are oriented by means of an electric field, the layer that is electrically alterable in its optical effect becomes transparent and consequently for example the color effect of a binary microstructure becomes recognizable to an observer.

It can further be provided that the second electrode layer has second microstructures in at least one fourth region, in particular has second diffractive relief structures selected from the group of Kinegram® or holograms, zero-order diffraction structures, blazed gratings, in particular asymmetrical saw-tooth relief structures, diffraction structures, in particular linear sinusoidal diffraction gratings or crossed sinusoidal diffraction gratings, or linear single- or multi-step rectangular gratings or crossed single- or multi-step rectangular gratings, light-diffracting and/or light-refracting and/or light-focusing micro- or nanostructures, binary or continuous Fresnel lenses, binary or continuous Fresnel freeform surfaces, diffractive or refractive macrostructures, in particular lens structures or microprism structures, mirror surfaces and mat structures, in particular anisotropic or isotropic mat structures, or combinations of these structures.

According to a further preferred embodiment example of the invention the at least one layer that is electrically alterable in its optical effect has a multitude of spheres which contain the liquid crystals and the rod-shaped dye molecules. The spheres preferably have a diameter of from 0.1 µm to 40 µm. It is further advantageous if the layer thickness of the at least one layer that is electrically alterable in its optical effect with the multitude of spheres is at most 90 µm, preferably at most 45 µm, particularly preferably at most 15 µm. The thicker the layer thickness is, the more effectively the at least one layer that is electrically alterable in its optical effect scatters or absorbs incident light in the more opaque state and the less visible for example first microstructures of the first or lower electrode layer are to an observer. The spheres are for example bound in a polymer matrix of monomers, wherein the monomers are polymerized by means of ultraviolet (UV) light. The liquid crystals here preferably remain mobile in the spheres.

According to a further preferred embodiment example of the invention, the at least one layer that is electrically alterable in its optical effect is arranged between a first orientation layer with a first preferred direction and a second orientation layer with a second preferred direction. The longitudinal axes of the liquid crystals here become oriented according to the first preferred direction of the first orientation layer or the second preferred direction of the second orientation layer. In order to improve this orientation it is possible to use surface-active substances such as for example surfactants, in particular lecithins, silanes or polyimides. If for example the second preferred direction of the second orientation layer is rotated 90° vis-à-vis the first preferred direction of the first orientation layer, the longitudinal axes of the liquid crystals close to the first orientation layer become arranged according to the first preferred direction and those close to the second orientation layer become arranged according to the second preferred direction. In the region located in between, the orientations of the longitudinal axes of the liquid crystals preferably rotate continuously from the first preferred direction to the second preferred direction. As the orientation of the longitudinal axes of the rod-shaped dye molecules is altered with the orientation of the longitudinal axes of the liquid crystals, the rod-shaped dye molecules follow the rotation of the liquid crystals between the first orientation layer and the second orientation layer.

It can further be provided that the liquid crystals that can be oriented in the electric field are cholesteric liquid crystals.

It is further possible for the first orientation layer and/or the second orientation layer to be formed transparent or semi-transparent.

It is further also possible for the second orientation layer to be formed transparent and the first orientation layer to be formed reflective.

It can further be provided that the second preferred direction of the second orientation layer is rotated vis-à-vis the first preferred direction of the first orientation layer, in particular is rotated 45° or 90°.

It can further also be provided that the second preferred direction of the second orientation layer and the first preferred direction of the first orientation layer have the same orientation.

The first orientation layer and/or the second orientation layer preferably have a third diffractive relief structure, in particular a zero-order diffraction structure. It is thus possible for the third relief structure to determine the first preferred direction of the first orientation layer and/or the second preferred direction of the second orientation layer. It has surprisingly been shown that the longitudinal axes of the liquid crystals also become oriented to diffractive relief structures, in particular to high-frequency diffractive relief structures such as e.g. zero-order diffraction structures. As the orientation of the longitudinal axes of the rod-shaped dye mols is altered with the orientation of the longitudinal axes of the liquid crystals, the rod-shaped dye molecules follow the orientation of the liquid crystals.

It is further advantageous that the first orientation layer and/or the second orientation layer has the third diffractive relief structure in at least one fifth region and a fourth diffractive relief structure in at least one sixth region, wherein the third diffractive relief structure and the fourth diffractive relief structure differ in at least one of the parameters azimuth angle, grating period or grating depth. Interesting optical effects can hereby be achieved, which further increase the protection against forgery.

It is further possible for the at least one fifth region and/or the at least one sixth region to be formed patterned, in particular to be formed for representing a third item of information. A pattern can for example be a graphically formed outline, a figurative representation, an image, a motif, a symbol, a logo, a portrait, an alphanumeric character, a text and the like.

Advantageously, the third diffractive relief structure and/or the fourth diffractive relief structure is a high-frequency, in particular sinusoidal, relief structure with a grating period of between 190 nm and 500 nm, preferably 300 nm to 420 nm, and a grating depth of from 50 nm to 500 nm, preferably 80 nm to 250 nm. Such high-frequency relief structures are also called sub-wavelength gratings or zero-order diffraction structures.

According to a preferred embodiment example of the invention, the security element has a reflective layer, in particular an HRI or LRI layer or a metal layer.

It is further also possible for the reflective layer to be formed by a transparent reflective layer, for example a thin or finely-structured metallic layer, e.g. a layer of fine wires or filigree lines of metal, or a dielectric HRI (high refraction index) or LRI (low refraction index) layer. Such a dielectric reflective layer consists, for example, of a vapor-deposited layer of a metal oxide, metal sulfide, e.g. titanium oxide etc. with a thickness of from 10 nm to 150 nm.

According to a preferred embodiment example of the invention, the security element has at least one first polarizer layer.

This makes it possible to further improve the contrast between a more opaque state of the layer that is electrically alterable in its optical effect and a more transparent state of the layer that is electrically alterable in its optical effect.

It is thus possible for the at least one first polarizer layer to linearly polarize the light passing through the at least one first polarizer layer.

It is further advantageous that the security element has a second polarizer layer, wherein at least a part of the at least one layer that is electrically alterable in its optical effect is arranged between the at least one first polarizer layer and the second polarizer layer. As only light which has the same polarization as the first or second polarizer layer can pass through the first polarizer layer or through the second polarizer layer, depending on the orientation of the liquid crystals and the rod-shaped dye molecules in the at least one layer that is electrically alterable in its optical effect, light can pass through this layer or is absorbed in the first polarizer layer and/or the second polarizer layer.

It is thus possible for the second polarizer layer to linearly polarize the light passing through the second polarizer layer.

It is further also possible for the at least one first polarizer layer and/or the one second polarizer layer to be a layer of semi-crystalline polymer.

Preferably, the at least one first polarizer layer and/or the one second polarizer layer has a layer thickness of between 5 µm and 15 µm, preferably between 7 µm and 10 µm. This makes it possible on the one hand by using a first polarizer layer and/or a second polarizer layer to further improve the contrast between a more opaque state of the layer that is electrically alterable in its optical effect and a more transparent state of the layer that is electrically alterable in its optical effect for an observer and on the other hand such a security element can be used on security documents of small thickness, such as for example banknotes, without the overall impression, usability or durability of the security document being substantially affected by the security element.

It is further also possible for the at least one first polarizer layer and/or the one second polarizer layer to have a chromaticity.

It is further possible for the at least one first polarizer layer and/or the one second polarizer layer to have a transmission of light in the wavelength range between 400 nm and 550 nm of less than 30%.

According to a further embodiment example of the invention the security element has at least one first color filter layer, wherein the at least one layer that is electrically alterable in its optical effect and the at least one first color filter layer at least partially overlap with each other. This makes it possible to generate further color changes or to reinforce existing color changes. Thus it is for example possible to reinforce a red, opaque color impression of the more opaque state of the at least one layer that is electrically alterable in its optical effect by means of a red color filter layer. This makes it possible to further increase the protection against forgery of the security element.

It is further advantageous if the security element has a second color filter layer, wherein at least a part of the at least one layer that is electrically alterable in its optical effect is arranged between the at least one first color filter layer and the second color filter layer, and the at least one first color filter layer and the second color filter layer are colored differently.

Preferably, the at least one first color filter layer and/or the second color filter layer forms a pattern with differently colored pattern elements. A pattern can for example be a graphically formed outline, a figurative representation, an image, a motif, a symbol, a logo, a portrait, an alphanumeric character, a text and the like.

According to a further preferred embodiment example of the invention, the security element has at least one effect layer which influences the optical appearance of the security element.

Advantageously, the at least one effect layer is an optically invariable layer, in particular at least one printed color layer.

It is further possible for the at least one effect layer to be an optically variable layer, in particular at least one color layer which has a binder and optically variable pigments.

By "optically variable pigments" is meant here in particular pigments which, in particular due to interference effects, produce a color effect which is dependent on the observation angle. In order to produce such a color-change effect with a high degree of brilliance, the pigments must have a similar orientation to each other. Such pigments are for example optically variable pigments (OVPs).

By a "binder" is meant here a liquid material which contains various pigments and which can be transferred together with the pigments by means of a printing process. Such combinations of binders and pigments are for example optically variable inks (OVI®) which produce an optically variable color impression, in particular by means of interference effects. OVIs typically have to be printed in significant layer thicknesses in order to produce a recognizable color-change effect with a high degree of brilliance.

It is further possible for the at least one effect layer to be a replication varnish layer into which fifth diffractive relief structures are molded, in particular Kinegram® or holograms, zero-order diffraction structures, blazed gratings, in particular asymmetrical saw-tooth relief structures, diffraction structures, in particular linear or crossed sinusoidal diffraction gratings, light-diffracting and/or light-refracting and/or light-focusing micro- or nanostructures, binary or continuous Fresnel lenses, binary or continuous Fresnel freeform surfaces, diffractive or refractive macrostructures, in particular lens structures or microprism structures, mirror surfaces or mat structures, in particular anisotropic or isotropic mat structures, or combinations of these structures.

It is further advantageous if the fifth diffractive relief structures of the replication varnish layer are metalized at least in regions.

According to a further preferred embodiment example of the invention, the thickness of the at least one layer that is electrically alterable in its optical effect varies in a predetermined manner. It is possible for the at least one layer that is electrically alterable in its optical effect to have a change in layer thickness extending linearly over the width of the layer, or a change in layer thickness starting radially from a point. As a thicker region of the at least one layer that is electrically alterable in its optical effect requires a longer period of time or a higher electric field in order to change between the more opaque, colored state and the more transparent, more weakly colored state, locally alterable state changes can be generated in this way with time and/or with the voltage applied. For example optical effects similar to a movement effect of the at least one layer that is electrically alterable in its optical effect can also be achieved in this way.

The security element preferably has a thickness perpendicular to the plane spanned by the underside of the security element of at most 100 µm, preferably at most 80 µm, further preferably at most 60 µm, and particularly preferably at most 40 µm. Such a security element is for example particularly suitable for thin and flexible security documents, such as for example banknotes.

It is further possible for the optical effect of the at least one layer that is electrically alterable in its optical effect to be reversibly controllable. This makes it possible for the layperson in particular to check the authenticity of the security element or security document to which the security element can be applied, as it is possible to change between the more opaque state and the more transparent state of the at least one layer that is electrically alterable in its optical effect, as often as desired.

It is particularly preferred if the security element overall is transparent or at least semi-transparent, provided that the at least one layer that is electrically alterable in its optical effect is also switched into the transparent state. By "semi-transparent" is meant here an optical density (OD) for a wavelength of 550 nm of less than 1.0, preferably of less than 0.6, particularly preferably of less than 0.4, further preferably of less than 0.3 and in particular preferably of less than 0.2.

According to a further preferred embodiment example of the invention, the security element has at least one energy source controlling the at least one layer that is electrically alterable in its optical effect, which can for example be a piezoelectric energy source with at least one layer of piezoelectric material.

The energy source is preferably an energy source that is formed mechanically flexible. This makes it possible to also use this energy source in flexible security documents such as banknotes.

It has proved successful if a polymer, in particular of the polyvinylidene fluoride (PVDF) type, is used as piezoelectric material. Other possible piezoelectric materials such as polyamides, polyurethanes, fluoropolymers and in particular copolymers derived therefrom can also be used.

According to a preferred development, the security element is arranged at least in regions in a transparent region of the security document and/or a window of the security document. By means of this arrangement both sides of the security element are visible to an observer. It is thereby possible for the security element to display a different optical appearance depending on the direction of observation (observation from the front or back), incidence of light (reflected light or transmitted light) and state of the at least one layer that is electrically alterable in its optical effect (more opaque, colored state or more transparent, more weakly colored state).

The security document can for example be a banknote, security paper, share certificate, credit card, bank card, cash card, loyalty card, ticket or an ID document such as an identification card, visa, driver's license, in particular a smart card or a passport. Embodiment examples of the invention are explained below by way of example with the aid of the attached figures, which are not to scale.

BRIEF DESCRIPTION OF THE DRAWINGS

FIG. 15a to FIG. 15f show schematic top views of security elements

DETAILED DESCRIPTION OF THE INVENTION

Figure 1A:
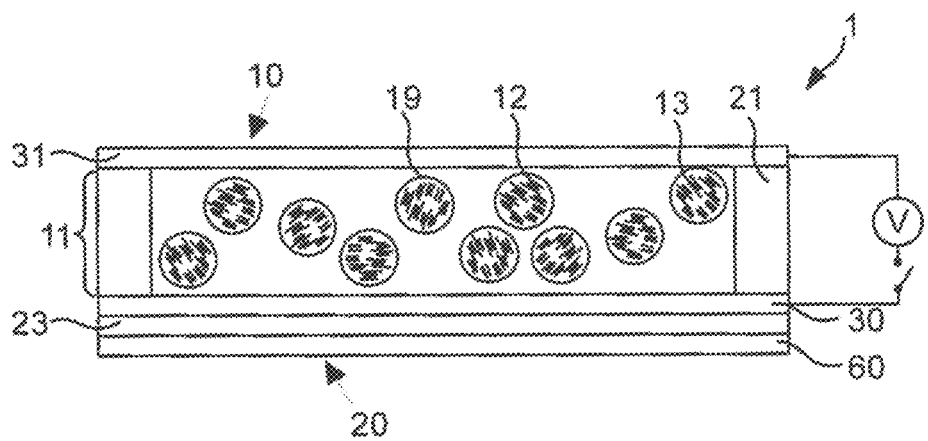
FIG. 1a and FIG. 1b show schematic sectional representations of a security element
Figure 1B:
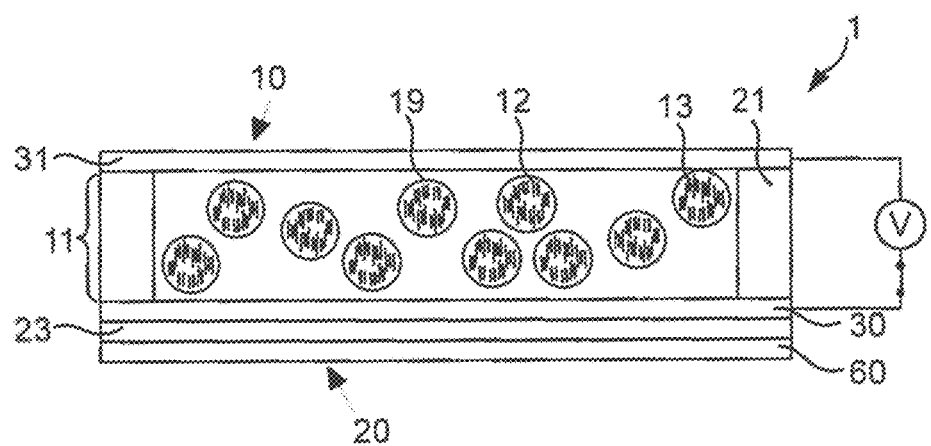

FIGS. 1a and 1b show a security element 1 with an upper side 10 and an underside 20, which has a layer 11 that is electrically alterable in its optical effect, a first electrode layer 30, a second electrode layer 31, an auxiliary layer 23, a support layer 21 and a reflective layer 60.

The security element can be applied to a substrate e.g. by means of an adhesive layer, wherein the adhesive layer is arranged e.g. between the reflective layer 60 and the substrate.

The first electrode layer 30 and the second electrode layer 31 are here designed as lower electrode layer 30 and upper electrode layer 31, between which at least a part of the layer 11 that is electrically alterable in its optical effect is arranged. A voltage can be applied to the electrode layers 30, 31 for producing an electric field between the electrode layers 30, 31. The upper electrode 31 is preferably transparent, translucent or semi-transparent, e.g. formed of ITO or (PEDOT)/PSS. It is also possible for the electrode layers to be shaped as thin metal layers for example of gold, silver, chromium, copper or aluminum, in particular with a layer thickness of between 0.5 nm and 50 nm, or as fine wires or filigree lines of the above-named metals in particular with a diameter or width of between 1 μm and 100 μm.

The optional auxiliary layer 23 can for example be an adhesive layer, an adhesion-promoter layer, a stabilizing layer, a support layer, a leveling layer or a base layer.

The support layer 21 which, seen perpendicularly to the plane spanned by the underside 20 of the security element, at least partially forms a frame around the layer 11 that is electrically alterable in its optical effect can for example consist of a UV-cured varnish. The support layer 21 further contributes to a standardization of the distance between the first electrode layer 30 and the second electrode layer 31 in the region of the layer 11 that is electrically alterable in its optical effect, with the result that the electric field is as constant as possible over the region of the layer 11 that is electrically alterable in its optical effect and homogeneously switches the layer 11 that is electrically alterable in its optical effect. In addition, by means of the support layer 21, a sealing or optical boundary of the at least one layer 11 that is electrically alterable in its optical effect and/or an optimization of the adhesion of the second electrode layer 31 can be achieved. The support layer 21 can also serve as a bounding frame for the layer 11 that is electrically alterable in its optical effect and to be applied in the liquid state, so that the layer 11 that is electrically alterable in its optical effect can be applied, in particular printed on and/or using a doctor blade, locally limited and register accurate, i.e. positionally accurate, relative to the other layers. The support layer 21 is formed electrically insulating, in order to avoid an electric short circuit between the first electrode layer 30 and the second electrode layer 31.

The reflective layer 60 is shaped as a metal layer for example of gold, silver, chromium, copper or aluminum. It is also possible for the reflective layer 60 to be formed by a transparent or semi-transparent reflective layer, for example a thin or finely structured metallic layer or a dielectric HRI (high refraction index) or LRI (low refraction index) layer. Such a dielectric reflective layer consists, for example, of a vapor-deposited layer made of a metal oxide, metal sulfide, e.g. titanium oxide etc. with a thickness of from 10 nm to 150 nm.

The layer 11 that is electrically alterable in its optical effect here has spheres 19, which have liquid crystals 12 and rod-shaped dye molecules 13. The spheres preferably have a diameter of from 0.1 μm to 40 μm. The layer thickness of the layer 11 that is electrically alterable in its optical effect with the multitude of spheres 19 is at most 90 μm, preferably at most 45 μm, particularly preferably at most 15 μm. The spheres 19 are for example bound in a polymer matrix of monomers which are polymerized by means of ultraviolet (UV) light.

Figure 1C:
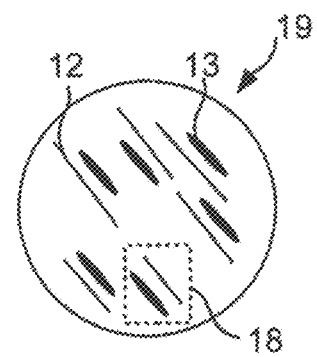
FIG. 1c shows a schematic sectional representation of a sphere of a security element

FIG. 1c shows an enlarged representation of a sphere 19 which has liquid crystals 12 and rod-shaped dye molecules 13.

Figure 1D:
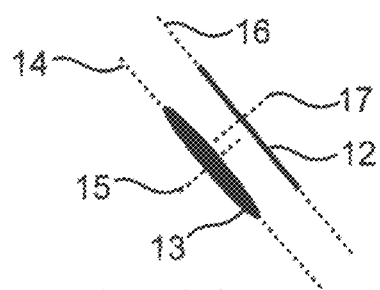
FIG. 1d shows a schematic, enlarged section of the sphere according to FIG. 1c FIG. 2a and FIG. 2c show a schematic sectional representation of a security element

FIG. 1d in turn shows an enlarged representation of a section 18 of FIG. 1c, which shows a liquid crystal molecule 12 with a longitudinal axis 16 and a transverse axis 17 and a rod-shaped dye molecule 13 with a longitudinal axis 14 and a transverse axis 15. The angle between the longitudinal axis 16 of the liquid crystal molecules 12 and the longitudinal axis 14 of the rod-shaped dye molecules 13 on average is preferably smaller than 20° if the layer 11 that is electrically alterable in its optical effect is in the more transparent state.

Suitable rod-shaped dye molecules 13 are for example dyes of general formula (1):

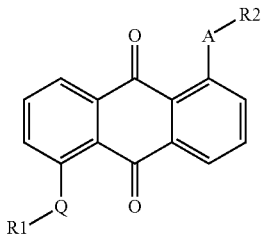

(1)

wherein A and Q, independently of each other, mean nitrogen, oxygen or sulfur, preferably oxygen or sulfur, further preferably sulfur, and wherein R1 and R2, independently of each other, mean an unsubstituted or substituted aryl radical or an unsubstituted or substituted heteroaryl radical, preferably an unsubstituted or substituted phenyl radical.

R1 and R2 can preferably be substituted identically or differently from each other.

A suitable aryl radical preferably has at least 6 C atoms, further preferably 6 C atoms to 14 C atoms. A suitable aryl radical is for example a phenyl radical, a naphthyl radical, an anthryl radical or phenanthryl radical, preferably a phenyl radical.

A suitable heteroaryl radical is for example a pyridyl radical, a quinoline radical or a 3-isoquinoline radical.

The above-named aryl radicals, preferably phenyl radicals, or heteroaryl radicals can be substituted with at least one C1 to C8 alkyl radical, with at least one C1 to C8 heteroalkyl radical, with at least one C1 to C8 alkoxy radical, with at least one C1 to C8 alkyl sulfanyl radical, with at least one hydroxy radical, with at least one sulfanyl radical or with at least one halogen atom.

An above-named C1 to C8 alkyl radical is for example methyl, ethyl, 1-propyl, 2-propyl, n-but-1-yl, n-but-2-yl, t-but-1-yl or t-but-2-yl. An above-named C1 to C8 heteroalkyl radical is for example methylamino, dimethylamino, ethylamino, diethylamino or trifluoromethyl. An above-named C1 to C8 alkoxy radical is for example methoxy, ethoxy or propoxy. An above-named C1 to C8 alkyl sulfanyl radical is for example methylsulfanyl, ethylsulfanyl or propylsulfanyl.

Suitable halogen atoms are for example fluorine, chlorine, bromine or iodine.

It is further possible for suitable rod-shaped dye molecules 13 to be for example anthraquinone dyes of formulae (2) to (4).

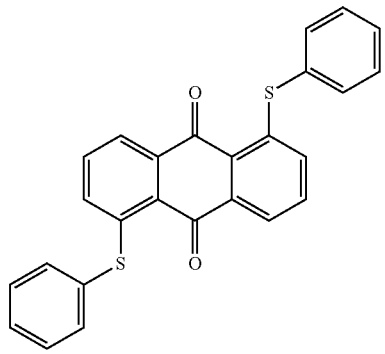

(2)

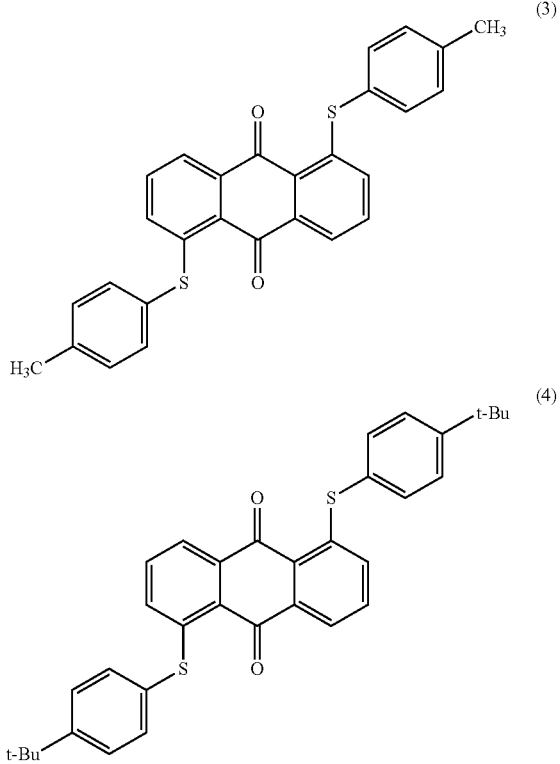

Suitable anthraquinone dyes of formulae (2) to (4) are commercially available from Nematel GmbH & Co. KG, Mainz, Germany.

It is thus possible for the rod-shaped dye molecules 13 to be selected from the group which consists of 1,5-bis(phenylsulfanyl)anthracene-9,10-dione, 1,5-bis(p-tolylsulfanyl)anthracene-9,10-dione, 1,5-bis[(4-tert-butylphenyl)sulfanyl]anthracene-9,10-dione and mixtures thereof.

It has proved successful if the concentration of the rod-shaped dye molecules 13 in the layer 11 that is electrically alterable in its optical effect is between 0.05 percent by weight and 4 percent by weight, preferably between 0.15 percent by weight and 2.0 percent by weight and particularly preferably between 0.5 percent by weight and 2.0 percent by weight.

Suitable liquid crystals 12 are for example the E7 mixture from Merck KGaA, Darmstadt, Germany. A suitable polymer matrix can be produced by polymerizing the NOA65 monomers from Norland Optical Adhesives, Cranbury, USA. The proportion of liquid crystals 12 in the layer 11 that is electrically alterable in its optical effect is for example between 50% and 99%.

If no voltage is applied to the electrode layers 30, 31, the liquid crystals 12 on average are isotropically oriented, i.e. arranged statistically or stochastically uniformly in all directions. As the longitudinal axes 14 of the rod-shaped dye molecules 13 are altered depending on the orientations of the longitudinal axes 17 of the spatially adjacent liquid crystals 12 that can be oriented in the electric field, the rod-shaped dye molecules 13 are also isotropically oriented on average. Incident light is on the one hand scattered due to the differences in the refractive index between the liquid crystals 12 and the polymer and on the other hand partially absorbed, i.e. depending on the orientation of the longitudinal axes 14 of the rod-shaped dye molecules 13. As a result the layer 11 that is electrically alterable in its optical effect is opaque. Depending on the rod-shaped dye molecule 13 used, the layer 11 that is electrically alterable in its optical effect can also have a particular chromaticity. This state is shown in FIG. 1*a*.

As the rod-shaped dye molecules 13 partially absorb the incident light, the opacity of the layer 11 that is electrically alterable in its optical effect is improved in the de-energized, i.e. switched-off, state and optionally produces a chromaticity. The opacity, i.e. the non-transparency, is dependent on the thickness along the direction of observation of the layer 11 that is electrically alterable in its optical effect, i.e. the quantity or thickness of the liquid crystals 12 and the rod-shaped dye molecules 13 in the polymer matrix. The thicker the layer 11 that is electrically alterable in its optical effect or the higher the proportion of spheres 19 which have the liquid crystals 12 and the rod-shaped dye molecules 13, the higher the opacity.

In addition the opacity is dependent on temperature. The higher the temperature, the higher the opacity, in particular due to the Brownian motion of the spheres 19 which have the liquid crystals 12 and the rod-shaped dye molecules 13, in the polymer matrix.

On the other hand, if a voltage is applied to the electrode layers 30, 31 and an electric field is consequently present in the layer 11 that is electrically alterable in its optical effect, the liquid crystals 12 become arranged parallel to the electric field, as represented in FIG. 1*b*. The arrangement of the liquid crystals 12 is therefore anisotropic. As the longitudinal axes 14 of the rod-shaped dye molecules 13 are altered depending on the orientations of the longitudinal axes 17 of the spatially adjacent liquid crystals 12 that can be oriented in the electric field, the rod-shaped dye molecules 13 are also anisotropically oriented on average. Incident light can consequently pass through the layer 11 that is electrically alterable in its optical effect, as on the one hand there are no substantial differences with respect to the refractive indices between the liquid crystals 12 and the polymer and on the other hand the absorption of the rod-shaped dye molecules 13 is clearly lower, because of their orientation with respect to the incident light, compared with the isotropic orientation.

FIG. 2*a* to FIG. 2*d* illustrate the mode of operation of a security element 1 with a layer 11 that is electrically alterable in its optical effect, a first electrode layer 30, a second electrode layer 31, an auxiliary layer 23, a support layer 21 and a reflective layer 60. With respect to the design of the layers, reference is made here to the above statements.

An observer 5 looks from above onto the security element 1 which is illuminated in reflected light with white light from a light source 6. The layer 11 that is electrically alterable in its optical effect can be switched between an opaque state as shown in FIG. 2*a* and a transparent state as shown in FIG. 2*c*.

Figure 2A:
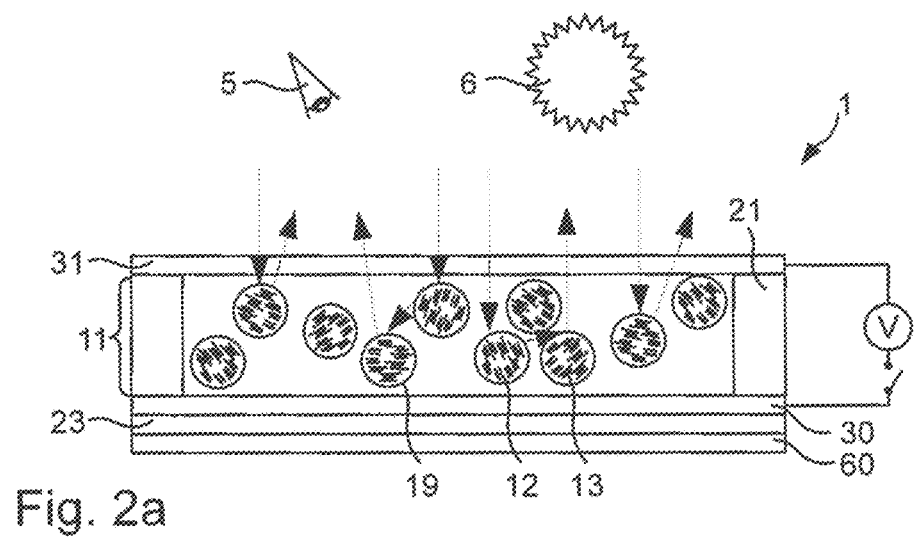
FIG. 2b and FIG. 2d show a schematic top view of the security element according to FIG. 2a and FIG. 2c FIG. 3a and FIG. 3b show schematic sectional representations of a security element

In the opaque state as shown in FIG. 2*a*, i.e. if no voltage is applied to the electrode layers 30, 31, incident light is on the one hand maximally scattered and on the other hand absorbed by the rod-shaped dye molecules 13. Because of their light-absorbing property, the rod-shaped dye molecules 13 produce in FIG. 2*a* a chromaticity for the observer 5, i.e. here a red color. The layer 11 that is electrically alterable in its optical effect is consequently opaque and has a red color. Ideally only a small proportion of the incident light reaches the reflective layer 60. The proportion of the light which reaches the reflective layer 60 in the opaque state determines the contrast of the layer 11 that is electrically alterable in its optical effect.

Figure 2B:
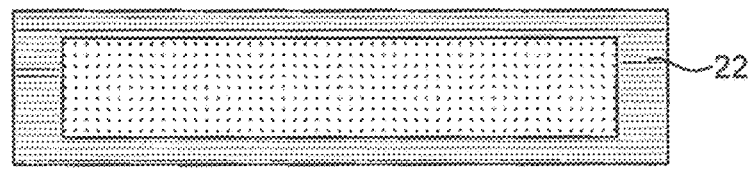

In the opaque state of the layer 11 that is electrically alterable in its optical effect, the security element 1 thus appears for example opaque red except for the frame 22 formed by the support layer 21, as shown in FIG. 2*b*, as the layer 11 that is electrically alterable in its optical effect is opaque and red.

Figure 2C:
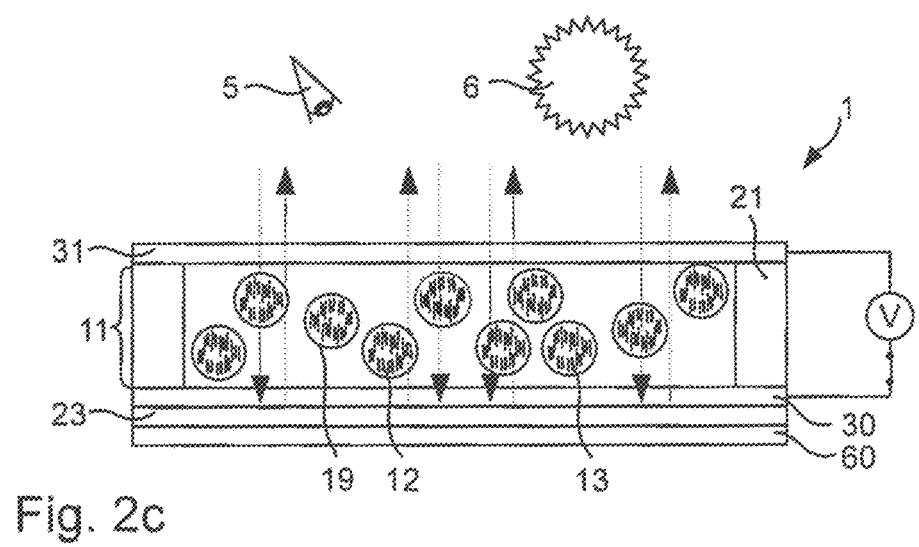

In the transparent state of the layer 11 that is electrically alterable in its optical effect, as shown in FIG. 2*c*, i.e. when a voltage is applied to the electrode layers 30, 31, the incident light can for the most part pass through up to the reflective layer 60, is reflected on the reflective layer 60 and again crosses through the layer 11 that is electrically alterable in its optical effect. The observer 5 can thus recognize the light reflected by the reflective layer 60, as both the light scattering of the liquid crystals 12 and the absorption of the rod-shaped dye molecules 13 are minimal.

Figure 2D:
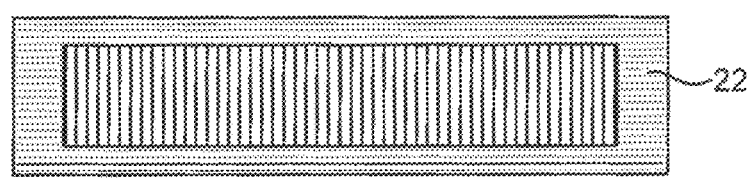

In the transparent state the layer 11 that is electrically alterable in its optical effect of the security element 1 is thus transparent except for the frame 22 formed by the support layer 21, as shown in FIG. 2*d*. The material of the support layer 21 can also optionally be formed transparent.

Figure 3A:
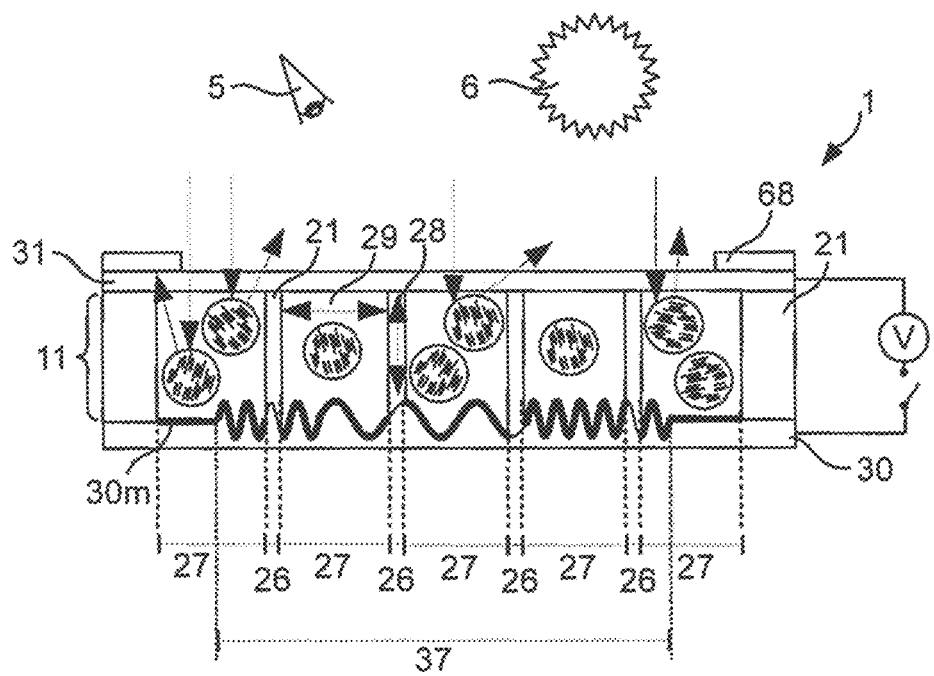
Figure 3B:
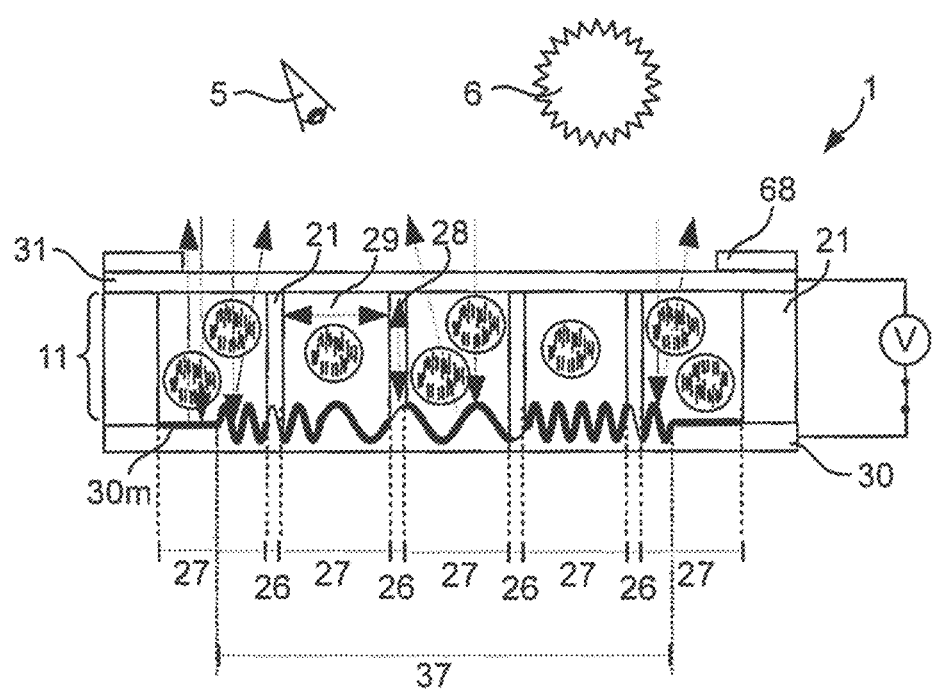
Figure 4A:
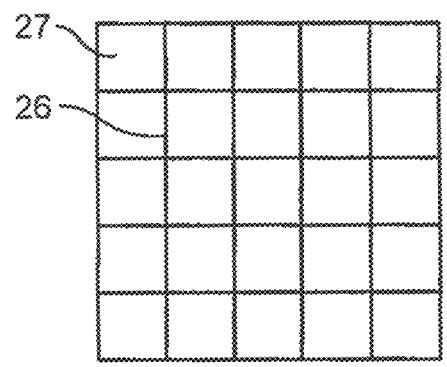
FIG. 4a to FIG. 4f show schematic top views of embodiment variants of a support layer of a security element
Figure 4B:
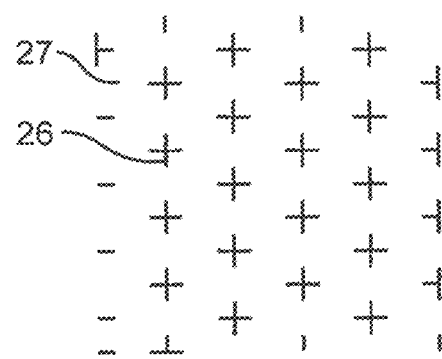
Figure 4C:
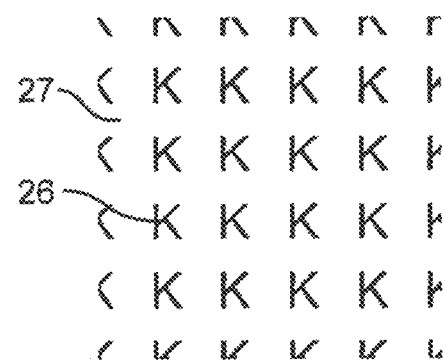
Figure 4D:
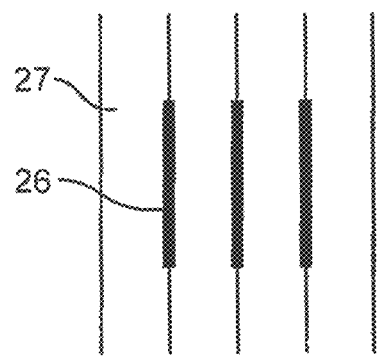
Figure 4E:
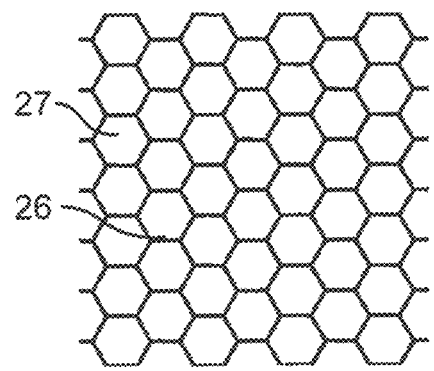
Figure 4F:
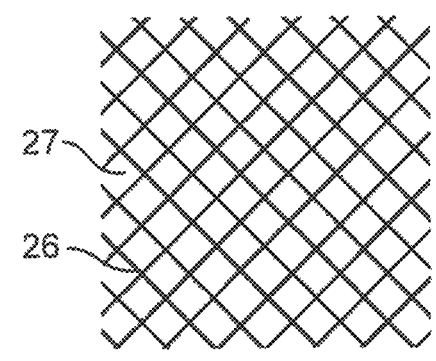

FIG. 3*a* and FIG. 3*b* show a further embodiment variant of the security element 1 according to the invention, which has a first electrode layer 30, a second electrode layer 31, a support layer 21, an effect layer 68 and a layer 11 that is electrically alterable in its optical effect.

The first electrode layer 30 and the second electrode layer 31 are here formed as lower electrode layer 30 and upper electrode layer 31. The lower electrode layer 30 has first microstructures in the region 37. The lower electrode layer 30 further has a metalization 30*m* in the zones 27. The metal layer 30*m* allows the optical effects generated by the first microstructures to emerge clearly or reinforces the optical effects generated.

It is further also possible for the upper electrode layer 31 and/or the lower electrode layer 30 to consist of several layers. Thus, for example, the lower electrode layer 30 can consist of a replication varnish layer into which first microstructures are molded at least in regions, and consist of a metal layer which is applied to the replication varnish layer in the form of a metalization at least in regions. The metal layer then forms the conductive layer of the lower electrode layer 30 and allows the optical effects generated by the first microstructures to emerge clearly.

The support layer 21 is present in the zones 26 and not present in the zones 27. In the zones 26, the support layer 21 has a height 28 between 1 µm and 50 µm, preferably between 2 µm and 30 µm, further preferably between 3 µm and 20 µm. The distance 29 between the zones 26 is between 5 µm and 500 µm, preferably between 10 µm and 300 µm, further preferably between 20 µm and 150 µm. In the zones 27, the security element 1 further has the layer 11 that is electrically alterable in its optical effect. As shown in FIG. 3*a*, the distance 29 between the zones 26 in which the support layer 21 is present is constant. However, it is also possible for the distance 29 to vary. The support layer 21 can for example be printed on in the zones 26. The support layer 21 is here designed electrically insulating, with the result that an electric short circuit between the lower electrode layer 30 and the upper electrode layer 31 is avoided.

It is also possible for the support layer 21 to be formed from a photoresist. For this, for example a metal layer, in particular an aluminum layer, is applied to a transparent base layer in regions. A photoresist is applied to the metal layer applied in regions; the photoresist is illuminated through the metal layer applied in regions. The metal layer applied in regions thus serves as an exposure mask for the photoresist.

When a negative photoresist is used, the illuminated regions remain as support layer 21 in the zones 26. Alternatively, it is also possible to use a positive photoresist. The photoresist can for example be printed on or applied using a doctor blade.

With respect to the design of the upper electrode layer 31, reference is made here to the above statements.

The effect layer 68 is arranged on the side facing the observer 5. The effect layer 68 influences the optical appearance of the security element 1. The effect layer 68 in FIG. 3a and FIG. 3b is here designed as a printed color layer and thus an optically invariable layer. It is further possible for the at least one effect layer 68 to be an optically variable layer, in particular at least one color layer which has a binder and optically variable pigments. The effect layer 68 can thus be for example a printed layer of an optically variable ink (OVI®) which produces an optically variable color impression, in particular by means of interference effects.

It is further possible for the at least one effect layer 68 to be a replication varnish layer into which diffractive relief structures are molded, in particular Kinegram® or holograms, zero-order diffraction structures, blazed gratings, in particular asymmetrical saw-tooth relief structures, diffraction structures, in particular linear or crossed sinusoidal diffraction gratings, light-diffracting and/or light-refracting and/or light-focusing micro- or nanostructures, binary or continuous Fresnel lenses, binary or continuous Fresnel freeform surfaces, diffractive or refractive macrostructures, in particular lens structures or microprism structures, mirror surfaces or mat structures, in particular anisotropic or isotropic mat structures, or combinations of these structures. It is further possible for the effect layer 68, in particular if this is shaped as a replication varnish layer, to be metalized in regions.

In the opaque state of the layer 11 that is electrically alterable in its optical effect, as shown in FIG. 3a, i.e. when no voltage is applied to the electrode layers 30, 31, incident light from a light source 6 is on the one hand maximally scattered and on the other hand absorbed by the rod-shaped dye molecules 13. The layer 11 that is electrically alterable in its optical effect is consequently opaque and for example black in color.

In the transparent state of the layer 11 that is electrically alterable in its optical effect, as shown in FIG. 3b, i.e. when a voltage is applied to the electrode layers 30, 31, the incident light from the light source 6 can pass through up to the metalization 30m of the lower electrode layer 30, is diffracted or refracted there on the first microstructures or, if no microstructures are present, reflected on the metalization 30m and again crosses through the layer 11 that is electrically alterable in its optical effect. The observer 5 can thus recognize the optical effects produced by the first microstructures or the reflected light, as both the light scattering of the liquid crystals 12 and the absorption of the rod-shaped dye molecules 13 are minimal.

FIG. 4a to FIG. 4f show top views of embodiment variants of a support layer. As shown in FIG. 4a to FIG. 4f, it is possible for the support layer to be present in the zones 26 and not present in the zones 27 and for the zones 26 to be formed patterned, in particular for representing a first item of information. A pattern can for example be a graphically formed outline, a figurative representation, an image, a motif, a symbol, a logo, a portrait, an alphanumeric character, a text and the like. Thus in FIG. 4a the support layer is shaped in a chessboard pattern in the zone 26, in FIG. 4b the support layer is shaped cross-shaped in the zones 26, in FIG. 4c the support layer is shaped in the form of an alphanumeric character in the zones 26, in FIG. 4d the support layer is shaped in lines of different widths in the zones 26, in FIG. 4e the support layer is shaped honeycombed in the zone 26 and in FIG. 4f the support layer is shaped as a chessboard pattern rotated 45° in the zone 26. The distance between the zones 26, as described in FIGS. 3a and 3b is typically between 5 µm and 500 µm, preferably between 10 µm and 300 µm, further preferably between 20 µm and 150 µm.

Figure 5A:
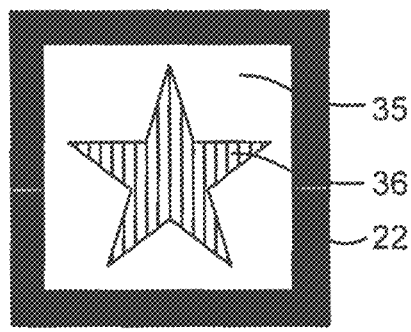
FIG. 5a to FIG. 5e show schematic top views of embodiment variants of a support layer of a security element

FIG. 5a to FIG. 5e show top views of embodiment variants of a support layer of a security element 1. Thus FIG. 5a shows a frame 22 formed by the support layer, and an electrode demetalized patterned in the shape of a star in a region 35. In the region 36 the electrode is metalized.

Figure 5B:
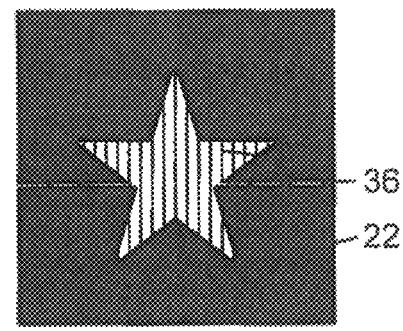

FIG. 5b shows a patterned, broad frame 22 formed in the shape of a star by the support layer, as well as the metalized electrode in the region 36.

Figure 5C:
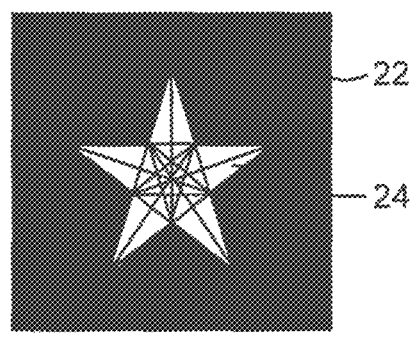
Figure 5D:
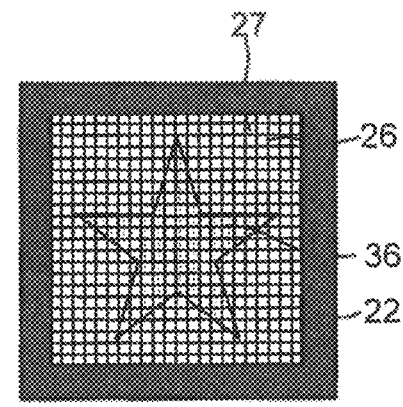

In turn, FIG. 5c shows a star-shaped broad frame 22 formed by the support layer, wherein the frame 22 additionally forms narrow bridges and in each case frames the partial regions 24. FIG. 5d shows a frame 22 formed by the support layer, as well as the electrode metalized in the shape of a star in the region 36, wherein the support layer is present in the zone 26 and not present in the zones 27. The zone 26 is here shaped in a chessboard pattern.

Figure 5E:
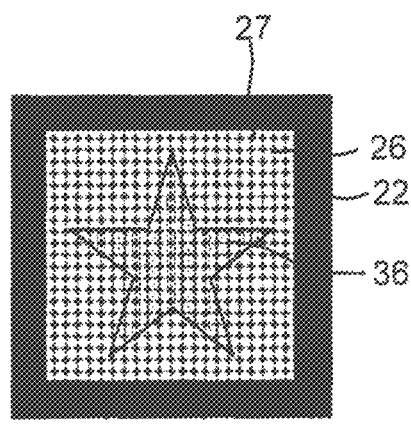

FIG. 5e shows a frame 22 formed by the support layer, as well as the electrode metalized in the shape of a star in the region 36, wherein the support layer is present in the zones 26 and not present in the zones 27. The zones 26 are here shaped cross-shaped.

Figure 6A:
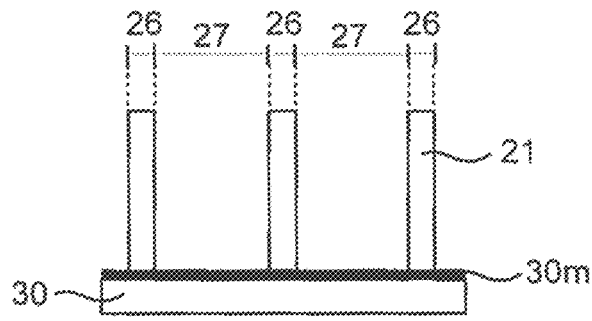
FIG. 6a to FIG. 6c show schematic sectional representations of an electrode of a security element
Figure 6B:
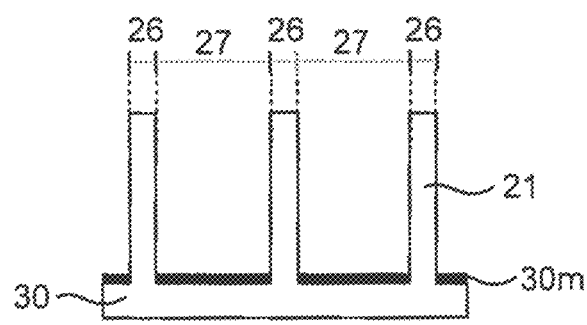
Figure 6C:
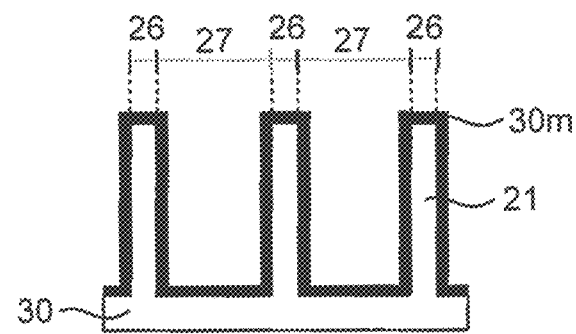

FIG. 6a to FIG. 6c show sectional representations of an electrode of a security element 1. FIG. 6a thus shows a lower electrode 30, to which a metalization 30m, for example of gold, silver, chromium, copper or aluminum, is applied over the entire surface. The lower electrode further has a support layer 21 in the zones 26. FIG. 6b shows a lower electrode 30, wherein the lower electrode 30 and the support layer 21 form one layer or are also merely connected. It is thus for example possible for the lower electrode to consist of several layers, for example of a replication varnish layer and a metalization 30m, wherein the support layer 21 is present on the demetalized regions, i.e. in contact with the replication varnish layer. This can be achieved e.g. by means of a lithography step. Support layer 21 and replication varnish layer in this case consist of different materials. Alternatively, the zones 26 of the support layer 21 can for example also be molded into the replication varnish layer, as shown in FIG. 6b. The metalization 30m which forms the electrically conductive layer of the lower electrode layer 30 is applied in the zones 27, i.e. in the spaces between the zones 26. It is further possible for the metalization 30m to be applied in the zones 26, the zones 27 and on the edges of the support layer 21 present in the zones 26, as shown in FIG. 6c.

Figure 7A:
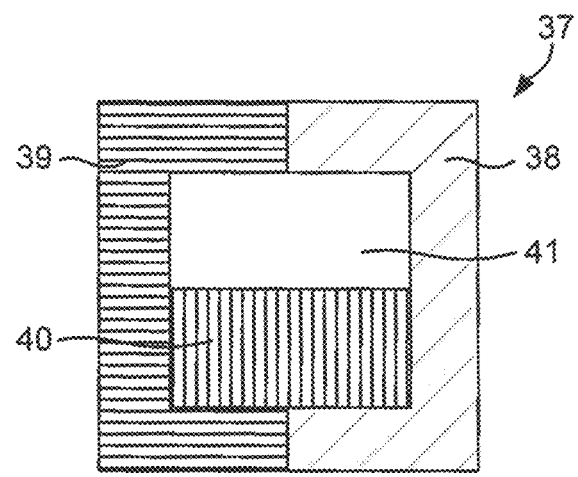
FIG. 7a to FIG. 7c show schematic top views of embodiment variants of an electrode of a security element
Figure 7B:
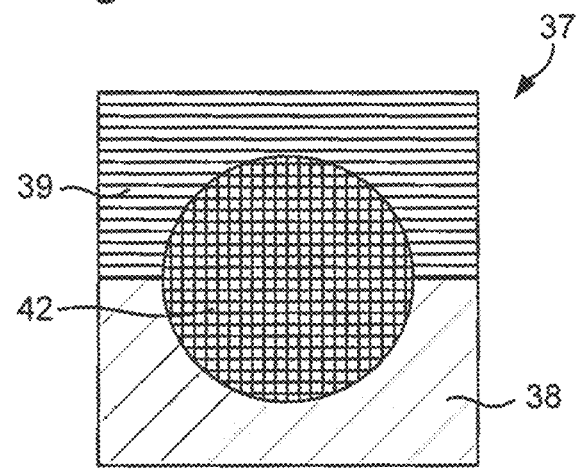
Figure 7C:
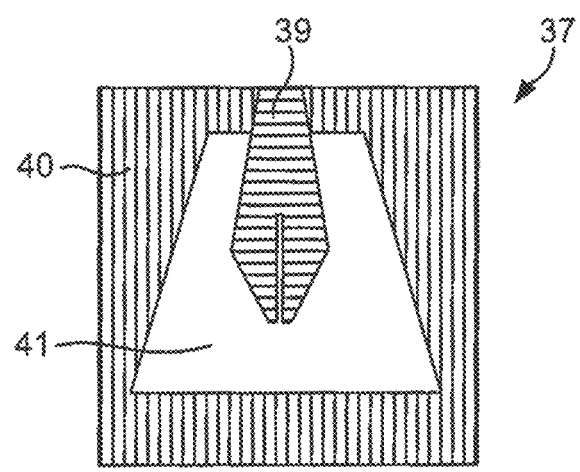

FIG. 7a to FIG. 7c show schematic top views of embodiment variants of an electrode of a security element 1. FIG. 7a thus shows the region 37 of a lower electrode which has different microstructures in the partial regions 38, 39, 40, 41. Thus the partial region 38 for example has a mirror surface, the partial region 39 has an isotropic mat structure, the partial region 40 has a first binary microstructure and the partial region 41 has a second binary microstructure, which generates a different color effect from the first binary microstructure in the range of the wavelengths visible to the human eye, in particular in the wavelength range of from 380 nm to 780 nm. The first distance between the first element surfaces of the first elements and the base surface of the first binary microstructure here is e.g. 380 nm and the first distance from the second binary microstructure here is e.g. 450 nm. FIG. 7b shows a further embodiment variant of a region 37 of a lower electrode which has different microstructures in the partial regions 38, 39 and 42. Thus the partial region 42 has a high-frequency diffractive relief structure, in particular a zero-order diffraction structure based on a crossed grating with an asymmetrical grating profile, wherein the color impression of this high-frequency diffractive relief structure is gold-colored at a steep observation angle of for example 10°. With respect to the partial regions 38 and 39, reference is made here to the above statements, i.e. they each have different microstructures. FIG. 7c shows a further embodiment variant of a region of a lower electrode which has different microstructures in the partial regions 39, 40 and 41. With respect to the partial regions 39, 40 and 41, reference is made here to the above statements.

Figure 8:
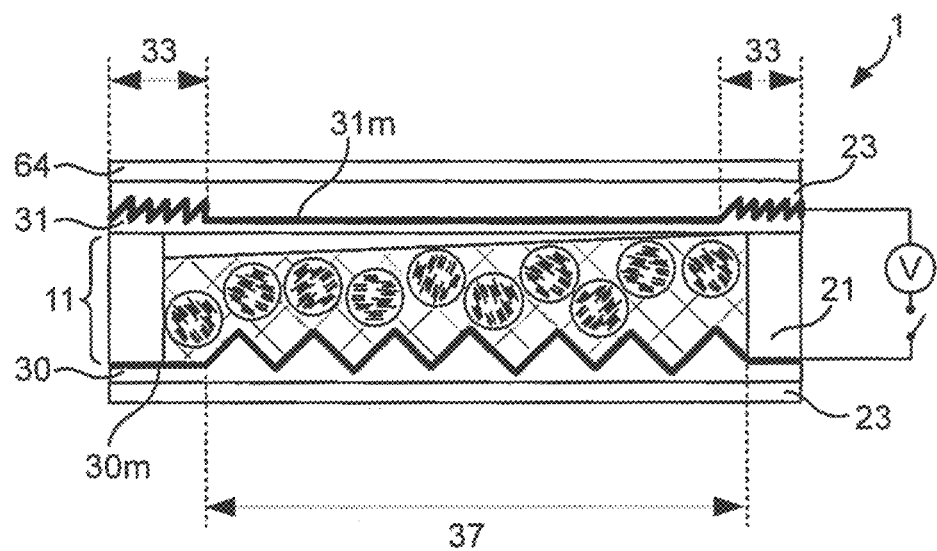
FIG. 8 shows a schematic sectional representation of a security element

FIG. 8 shows a further embodiment variant of the security element 1 according to the invention, which has auxiliary layers 23, a first electrode layer 30, a second electrode layer 31, a support layer 21, a polarizer layer 64 and a layer 11 that is electrically alterable in its optical effect. With respect to the layers 21 and 23, reference is made here to the above statements.

The first electrode layer 30 and the second electrode layer 31 are here formed as lower electrode layer 30 and upper electrode layer 31. The lower electrode layer 30 has a microstructure, for example a computer-generated hologram, in the region 37. The lower electrode layer 30 here consists of two partial layers, in particular a replication varnish layer and a metalization 30m.

The replication varnish layer consists for example of a thermoplastic varnish into which a surface structure is molded by the action of a stamping tool by means of heat and pressure. It is further also possible for the replication varnish layer to be formed by a UV-crosslinkable varnish and for the surface structure to be molded into the replication varnish layer by means of UV replication. The surface structure is molded onto the uncured replication varnish layer by the action of a stamping tool and the replication varnish layer is cured directly during or after the molding by irradiation with UV light.

The replication varnish layer preferably has a layer thickness of between 0.2 μm and 2 μm. The layer thickness of the replication varnish layer in FIG. 8 is 0.5 μm and it is an at least partially chemically crosslinked replication varnish layer. The surface structure molded into the replication varnish layer is preferably Kinegram®, holograms, blazed gratings, in particular asymmetrical saw-tooth relief structures, diffraction structures, in particular linear sinusoidal diffraction gratings or crossed sinusoidal diffraction gratings, or linear single- or multi-step rectangular gratings or crossed single- or multi-step rectangular gratings, mirror surfaces, mat structures, in particular anisotropic or isotropic mat structures, or combinations of these structures. It is further also possible for these to be binary microstructures. It is here possible for the binary microstructures to consist of a base surface parallel to the plane spanned by the underside of the security element and several first elements, wherein the first element surfaces of the first elements in each case run substantially parallel to the base plane and wherein the first element surfaces of the first elements and the base surface are spaced apart in a direction running perpendicular to the underside of the security element by a first distance which is selected such that a color is generated in particular by means of interference of the light reflected on the base surface and the first element surfaces in reflected light and/or in particular by means of interference of the light transmitted through the first element surfaces and the base surfaces in transmitted light, or for the binary microstructures to consist of a multitude of second elements adjacent to each other, wherein the second element surfaces of the second elements are arranged parallel to each other and have an edge adjacent to the second element surfaces of the second elements, wherein the second element surfaces of adjacent second elements are spaced apart in a direction perpendicular to the second element surfaces by a second distance or a multiple of the second distance, wherein the second distance is between 150 nm and 1500 nm.

In FIG. 8 a metalization 30m is applied to the replication varnish layer. The metalization is preferably a metal layer of chromium, aluminum, gold, copper, silver or an alloy of such metals which is vapor-deposited in a layer thickness of from 0.01 μm to 0.15 μm under vacuum. It is further also possible for the reflective layer to be formed by a transparent reflective layer, for example a thin or finely-structured metallic layer or a dielectric HRI (high refraction index) or LRI (low refraction index) layer. Such a dielectric reflective layer consists, for example, of a vapor-deposited layer of a metal oxide, metal sulfide, titanium oxide etc. of a thickness of from 10 nm to 150 nm. The metalization 30m in FIG. 8 is electrically conductive and therefore forms the electrically conductive layer of the lower electrode 30.

In the region 33, the upper electrode layer 31 has a microstructure, for example a Kinegram® or holograms, zero-order diffraction structures, blazed gratings, in particular asymmetrical saw-tooth relief structures, diffraction structures, in particular linear sinusoidal diffraction gratings or crossed sinusoidal diffraction gratings, or linear single- or multi-step rectangular gratings or crossed single- or multi-step rectangular gratings, light-diffracting and/or light-refracting and/or light-focusing micro- or nanostructures, binary or continuous Fresnel lenses, binary or continuous Fresnel freeform surfaces, diffractive or refractive macrostructures, in particular lens structures or microprism structures, mirror surfaces, mat structures, in particular anisotropic or isotropic mat structures, or combinations of these structures. The upper electrode layer 31 here consists of two partial layers, in particular a replication varnish layer and a metalization 31m. With respect to the replication varnish layer of the upper electrode and the metalization 31m, reference is made here to the above statements.

In FIG. 8, the layer 11 that is electrically alterable in its optical effect has a varying thickness. As shown in FIG. 8, the thickness of the layer 11 that is electrically alterable in its optical effect varies linearly transversely over the foil body, from a first, smaller thickness on the left-hand layer edge to a second, greater thickness on the right-hand layer edge. As thicker layers 11 that are electrically alterable in their optical effect require more voltage in order to switch from the opaque to the transparent state, it is possible by changing the thickness of the layer 11 that is electrically alterable in its optical effect, for example, to produce a transparency propagating over the security element 1, which propagates with increasing voltage.

The polarizing layer 64 polarizes incident light for example linearly. This makes it possible to improve the contrast between the opaque state of the layer 11 that is electrically alterable in its optical effect and the transparent state of the layer 11 that is electrically alterable in its optical effect. The polarizing layer 64 is preferably a layer of semi-crystalline polymer and has a layer thickness of between 2 μm and 20 μm, preferably between 5 μm and 15 μm, particularly preferably between 7 μm and 10 μm.

Furthermore, the polarizing layer 64 can have a chromaticity. Thus the polarizing layer can for example be green.

FIG. 9a to FIG. 9d show a further embodiment variant of the security element 1 according to the invention, which has a first electrode layer 30, a second electrode layer 31, a support layer 21, a reflective layer 60, a first polarizer layer 63, a second polarizer layer 64, a first orientation layer 50, a second orientation layer 51 and a layer 11 that is electrically alterable in its optical effect. With respect to the electrode layers 30 and 31, the support layer 21, the reflective layer 60 and the polarizer layers 63 and 64, reference is made here to the above statements.

The first electrode layer 30, the first polarizer layer 63 and the first orientation layer 50 are here formed as lower layers. The second electrode layer 31, the second polarizer layer 64 and the second orientation layer 51 are here formed as upper layers.

The layer 11 that is electrically alterable in its optical effect here has liquid crystals 12 and rod-shaped dye molecules 13. The liquid crystals 12 have electrical anisotropy and double refraction and are capable of rotating the polarization direction of polarized light. The rod-shaped dye molecules 13 alter the orientations of their longitudinal axes depending on the orientations of the longitudinal axes of the spatially adjacent liquid crystals 12 that can be oriented in the electric field as described above.

Figure 9A:
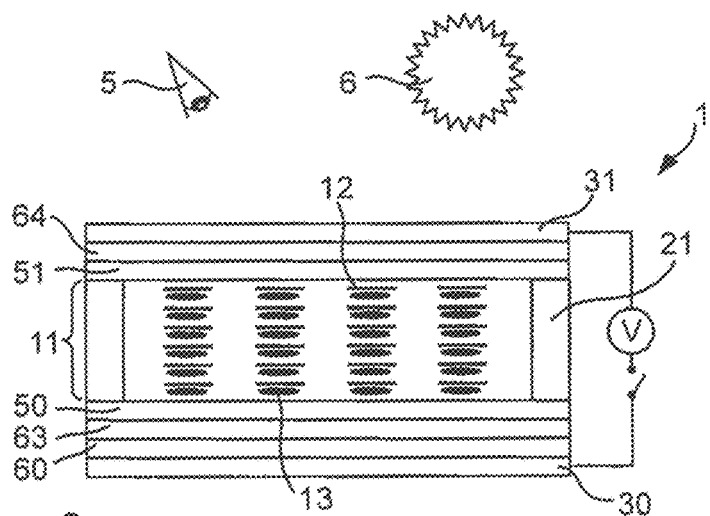
FIG. 9a and FIG. 9c show a schematic sectional representation of a security element

The lower orientation layer 50 and the upper orientation layer 51 each have a preferred direction. For example the surfaces of the orientation layers 50, 51 are brushed to produce the respective preferred directions. Polystyrene foam or rollers coated with textiles for example can be used for the brushing. The brushing process results in largely parallel grooved structures which determine the preferred direction of the orientation layers 50, 51. The orientation layers 50, 51 shown in FIG. 9a and FIG. 9c are designed transparent here. It is further also possible, for example, for the lower orientation layer 50 to be designed reflective. The polarizer layers 63, 64 as well as the upper electrode layer 31 in FIG. 9a and FIG. 9c are also designed transparent.

Without an applied voltage and thus without an electric field between electrode layers 30, 31, the liquid crystals 12 become oriented with their longitudinal axis parallel to the grooves of the orientation layers 50, 51, as shown in FIG. 9a. In order to improve this orientation, it is possible to use surface-active substances such as for example surfactants, in particular lecithins, silanes or polyimides. This on the one hand improves the orientation of the liquid crystals 12 according to the preferred directions of the orientation layers 50, 51 and on the other hand promotes a possible rotation of the liquid crystals 12, in the event that for example the preferred direction of the lower orientation layer 50 is rotated 90° vis-à-vis the preferred direction of the upper orientation layer 51. Generally, the longitudinal axes of the liquid crystals 12 close to the first orientation layer 50 are arranged according to the first preferred direction and, close to the second orientation layer 51, according to the second preferred direction. In the region lying in between, the orientations of the longitudinal axes of the liquid crystals 12 rotate continuously from the first preferred direction to the second preferred direction. As the orientation of the longitudinal axes of the rod-shaped dye molecules 13 which the layer 11 that is alterable in its optical effect has is altered with the orientation of the longitudinal axes of the liquid crystals 12, the rod-shaped dye molecules 13 follow the rotation of the liquid crystals 12 between the first orientation layer and the second orientation layer. Without applied voltage, the rod-shaped dye molecules 13 become oriented as shown in FIG. 9a parallel to the plane of the security element. The security element appears colored.

On the other hand, if a voltage is applied to the electrode layers 30, 31 and an electric field is consequently present in the layer 11 that is electrically alterable in its optical effect, the liquid crystals 12 and with them the dye molecules 13, become arranged parallel to the electric field, as represented in FIG. 9c, depending on the distance from the orientation layers 50, 51 and the voltage applied. The higher the voltage applied is, the better the liquid crystals 12 become oriented parallel to the electric field. For this, liquid crystals 12 close to the orientation layers 50, 51 require a higher voltage than liquid crystals 12 which lie further removed from the orientation layers 50, 51, as the liquid crystals close to the orientation layers 50, 51 are also subjected to a force for orientation according to the preferred directions of the orientation layers 50, 51. Because of the rod-shaped dye molecules 13 predominantly oriented perpendicular to the plane of the security element, the security element appears less colored or almost colorless. Furthermore, the color impression and the color intensity also depend on the orientation of the polarizer layers 63, 64.

In particular the embodiments of the polarizing layers 63, 64 of the orientation layers 50, 51 and of the layer 11 that is electrically alterable in its optical effect determine whether incident light from a light source 6 can pass through the security element 1 depending on a possible applied voltage, and thus determine the optical impression of the security element on an observer 5.

Embodiment variants of a security element 1 with different embodiments of the polarizing layers 63 and 64, the orientation layers 50 and 51 and the layer 11 that is electrically alterable in its optical effect are described below.

According to an embodiment variant of the security element 1, the preferred direction of the lower orientation layer 50 is rotated 90° vis-à-vis the preferred direction of the upper orientation layer 51. The upper polarizer layer 64 and the lower polarizer layer 63 polarize incident light linearly. If a coordinate system with the coordinate axes x and y located perpendicular to each other is spanned by the plane spanned by the underside of the security element 1, the preferred direction of the upper orientation layer 51 lies parallel to the x-axis and the preferred direction of the lower orientation layer 50 lies parallel to the y-axis.

The transmission axes of the linear polarizer layers 63, 64 then lie parallel to the x-axis.

The incident light from the light source 6 is polarized by the upper polarizer layer 64 linearly in the x-direction. The polarization directions are preserved after passing through the orientation layers 50, 51.

As described above, the liquid crystals 12 are capable of rotating the polarization direction, with the result that in the de-energized state after passing through the layer 11 that is alterable in its optical effect the polarization direction of the light is rotated 90°. The rod-shaped dye molecules 13 which become oriented with their longitudinal axes in the direction of the longitudinal axes of the liquid crystals 12 here absorb light as described above and produce for example a yellow color. After passing through the lower orientation layer 50, the polarization direction of the light is furthermore rotated 90° and is thus polarized linearly in the y-direction. The light polarized linearly in the y-direction is absorbed by the lower polarizing layer 63, as the transmission axes of the lower polarizer layer 63 lie parallel to the x-axis.

Figure 9B:
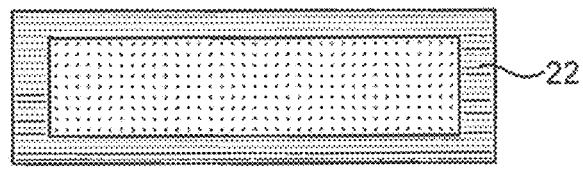
FIG. 9b and FIG. 9d show a schematic top view of the security element according to FIG. 9a and FIG. 9c
Figure 9C:
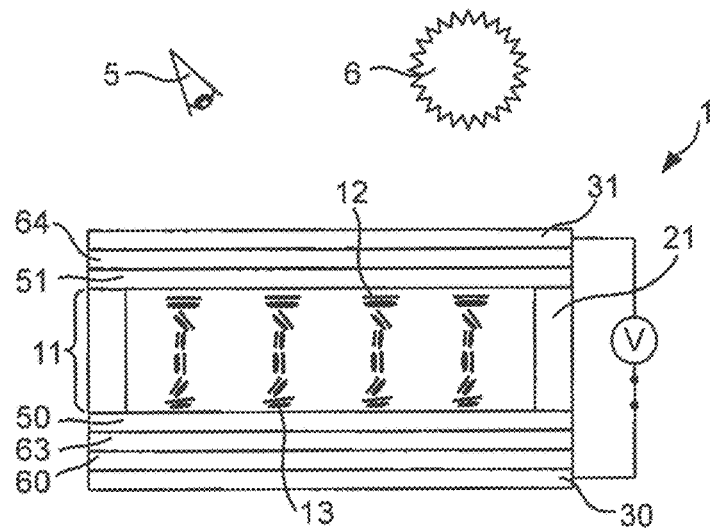

To the observer 5, the security element 1 thus appears opaque in the yellow color determined by the rod-shaped dye molecules 13, as shown in FIG. 9b.

If a voltage is now applied to the electrode layers 30, 31, the liquid crystals 12 and correspondingly the rod-shaped dye molecules 13 become oriented parallel to the electric field as described above. The light polarized linearly in the x-direction after passing through the upper polarizer layer 64 can now pass through up to the reflective layer 60, as it can pass through the lower polarizing layer 63, in which the transmission axes lie parallel to the x-axis The light is reflected on the reflective layer 60 and can again pass through the polarizing layers 63 and 64, the orientation layers 50, 51 and the layer 11 that is electrically alterable in its optical effect.

Figure 9D:
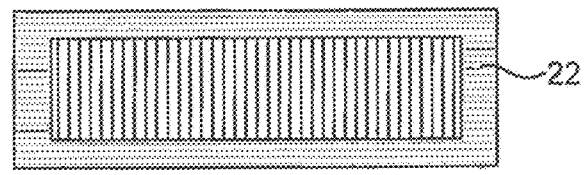

To an observer 5, the security element 1 thus appears transparent except for the frame 22 formed by the support layer 21, as shown in FIG. 9d. When voltage is applied, the observer 5 consequently sees the reflective layer 60 or effects of microstructures which are molded into a replication varnish layer provided with the reflective layer 60.

According to a further embodiment variant of the security element 1, the preferred direction of the lower orientation layer 50 and the preferred direction of the upper orientation layer 51 have the same orientation in the direction of the x-axis. The upper polarizer layer 64 and the lower polarizer layer 63 polarize incident light linearly, and the transmission axes of the linear polarizer layers 63, 64 lie parallel to a direction inclined at 45° vis-à-vis the x-axis. The layer thickness of the layer 11 that is electrically alterable in its optical effect here corresponds to that of a λ/2 plate.

The incident light from the light source 6 is polarized by the upper polarizer layer 64 linearly in a direction inclined at 45° vis-à-vis the x-axis inclined direction. The polarization directions are preserved after passing through the orientation layers 50, 51.

If no voltage is applied to the electrodes 30, 31, the polarization direction of the incident light is rotated by the layer 11 that is electrically alterable in its optical effect because of its layer thickness in such a way that the light is polarized linearly in a direction inclined at 135° vis-à-vis the x-axis after passing through the layer 11 that is electrically alterable in its optical effect. Light polarized in this way is absorbed by the lower polarizing layer 63, as the transmission axes of the lower polarizer layer 63 lie parallel to a direction inclined at 45° vis-à-vis the x-axis. To the observer 5, the security element 1 thus appears opaque in a color determined by the rod-shaped dye molecules 13, as light cannot pass through the layers of the security element 1 and the rod-shaped dye molecules 13 absorb the incident light.

If a voltage is now applied to the electrode layers 30, 31, the liquid crystals 12 and correspondingly the rod-shaped dye molecules 13 become oriented parallel to the electric field, as described above, with the result that the liquid crystal molecules of the layer 11 that is electrically alterable in its optical effect do not rotate the polarization direction of the light 90° and furthermore, because of their orientation, the rod-shaped dye molecules 13 only have a minimal absorption. To the observer 5, the security element 1 thus appears transparent as incident light can pass through the layers of the security element and the rod-shaped dye molecules hardly absorb the incident light.

Figure 10:
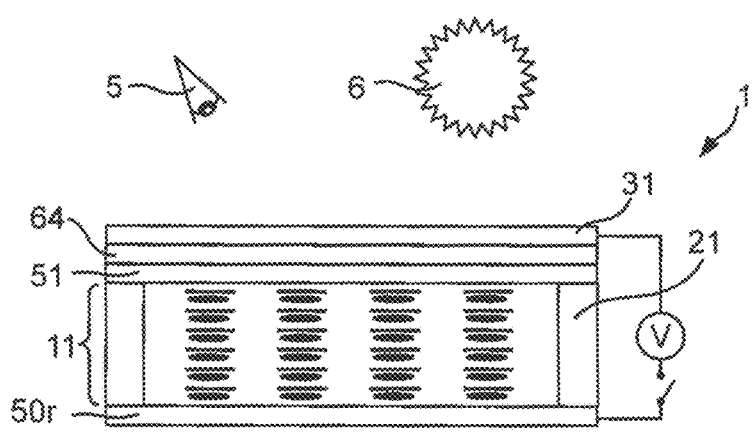
FIG. 10 shows a schematic sectional representation of a security element

FIG. 10 shows a further preferred embodiment example of a security element 1 according to the invention, which has a conductive, reflective first orientation layer 50r, a second electrode layer 31, a support layer 21, a second polarizer layer 64, a second orientation layer 51 and a layer 11 that is electrically alterable in its optical effect. With respect to the layers 31, 64, 51 and 21, reference is made here to the above statements.

The first orientation layer 50r has a diffractive relief structure. The diffractive relief structure is preferably a high-frequency, in particular sinusoidal, relief structure with a grating period of between 190 nm and 500 nm, preferably 300 to 420 nm, and a grating depth of from 50 nm to 500 nm, preferably 80 nm to 250 nm. Such high-frequency relief structures are also called sub-wavelength gratings or zero-order diffraction structures. It has surprisingly been shown that the longitudinal axes of the liquid crystals also become oriented to diffractive relief structures. As the orientation of the longitudinal axes of the rod-shaped dye molecules 13 is altered with the orientation of the longitudinal axes of the liquid crystals 12, the rod-shaped dye molecules 13 follow the orientation of the liquid crystals 12. Furthermore, such relief structures are capable of polarizing light, similarly to a polarizer, in particular when such relief structures are provided with a metal layer. The first orientation layer 50r is therefore designed reflective. Thus it is for example possible for the first orientation direction layer 50r to be formed multi-layered. For example the first orientation layer can consist of a replication varnish layer, into which the diffractive relief structure is molded, and have a metalization which achieves on the one hand the conductive part of the first orientation layer 50r and on the other hand the reflectivity of the first orientation layer 50r.

The layer thickness of the layer 11 that is electrically alterable in its optical effect here corresponds to that of a λ/4 plate, with the result that the layer 11 that is electrically alterable in its optical effect in the de-energized state of the security element 1 changes linearly polarized light to circularly polarized light, similarly to a λ/4 plate. Thus, if for example the incident light from the light source 6 is polarized by the upper or second polarizer layer 64 linearly in a direction inclined at 45° vis-à-vis the x-axis, after passing through the layer 11 that is electrically alterable in its optical effect it has a left-hand circular polarization which changes to right-hand circular by reflection on the first orientation layer 50r. After again passing through the layer 11 that is electrically alterable in its optical effect, the light is again polarized linearly and the polarization direction now polarized through 90° overall vis-à-vis the original direction inclined at 45° vis-à-vis the x-axis inclined direction and is thus absorbed by the second polarizer layer 64. The security element 1 thus appears opaque to an observer 5.

If a voltage is now applied to the layers 31 and 50r, the liquid crystals 12 and correspondingly the rod-shaped dye molecules 13 become oriented parallel to the electric field, as described above, with the result that the liquid crystal molecules 12 of the layer 11 that is electrically alterable in its optical effect do not change the polarization direction of the light and furthermore the rod-shaped dye molecules 13 have only a minimal absorption because of their orientation. Incident light can thus pass through the layers 31, 64, 51 and 11 of the security element 1 and is reflected on the first orientation layer 50r. An observer can thus recognize the optical effects produced by the sinusoidal relief structure of the first orientation layer 50r.

Figure 11:
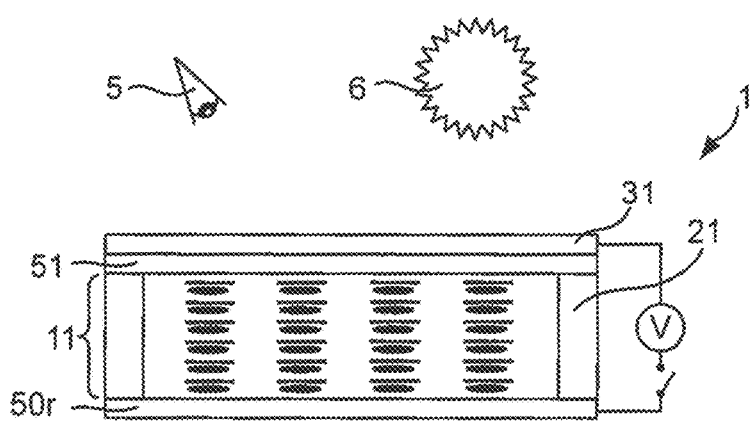
FIG. 11 shows a schematic sectional representation of a security element

FIG. 11 shows a further preferred embodiment example of a security element 1 according to the invention, which has a conductive, reflective first orientation layer 50r, a second electrode layer 31, a support layer 21, a second orientation layer 51 and a layer 11 that is electrically alterable in its optical effect. With respect to the layers 31, 51, 21, 11 and 50r, reference is made here to the above statements.

The security element of FIG. 11 in comparison with the security element of FIG. 10 thus has no upper or second polarizing layer.

In the de-energized state the liquid crystals 12 become oriented, as described above, with their longitudinal axis and thus also the rod-shaped dye molecules 13 parallel to the grooved structures of the orientation layers 51, 50*r*. As described above, the rod-shaped dye molecules 13 have their maximum absorption in this orientation.

If a voltage is now applied to the layers 31 and 50*r*, the liquid crystals 12 and correspondingly the rod-shaped dye molecules 13 become oriented, as described above, parallel to the electric field and the absorption of the rod-shaped dye molecules 13 is minimal, as described above. An observer can thus recognize the optical effects produced by the sinusoidal relief structure of the first orientation layer 50*r*.

Figure 12A:
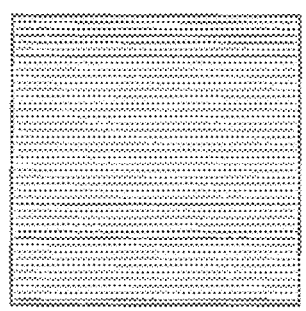
FIG. 12a to FIG. 12c show schematic top views of embodiment variants of orientation layers of a security element
Figure 12B:
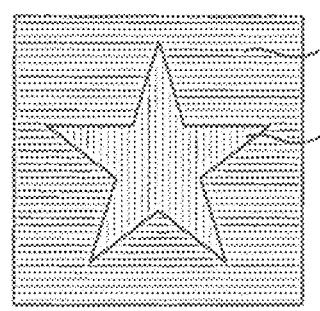
Figure 12C:
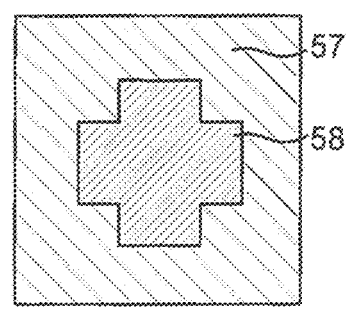

FIG. 12*a* to FIG. 12*c* show top views of embodiment variants of orientation layers of a security element 1. Thus FIG. 12*a* shows a first or also lower orientation layer which has a sinusoidal relief structure, in particular a zero-order diffraction structure. FIG. 12*b* shows a lower orientation layer which has a sinusoidal relief structure with a grating period of 250 nm in the region 56 and a sinusoidal relief structure with a grating period also of 250 nm in the star-shaped region 55. The azimuth angle of the sinusoidal relief structure in the region 55 is here rotated 90° vis-à-vis the azimuth angle of the sinusoidal relief structure in the region 56. FIG. 12*c* shows a lower orientation layer which has a sinusoidal relief structure in the region 57, which differs from the sinusoidal relief structure in the cross-shaped region 58 by the grating period, the grating depth and the azimuth angle.

Figure 13A:
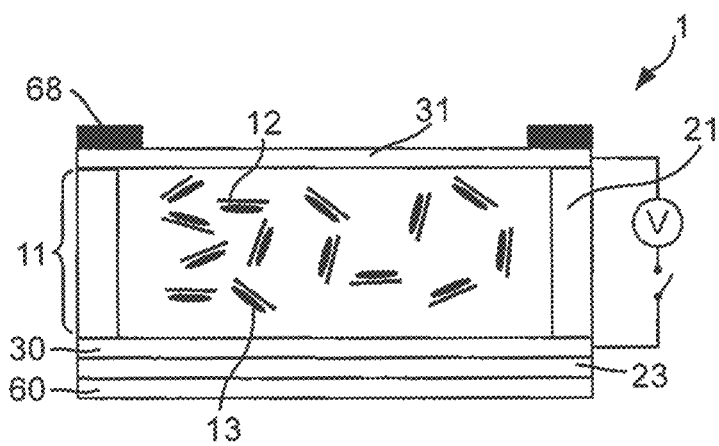
FIG. 13a and FIG. 13b show schematic sectional representations of a security element
Figure 13B:
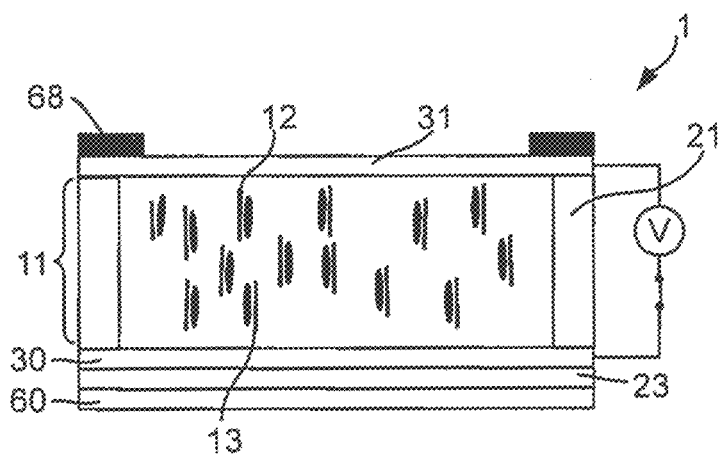

FIG. 13*a* and FIG. 13*b* show a further preferred embodiment example of a security element 1 according to the invention, which has a reflective layer 60, a first electrode layer 30, a second electrode layer 31, a support layer 21, an auxiliary layer 23, an effect layer 68 and a layer 11 that is electrically alterable in its optical effect. With respect to the layers 68, 31, 21, 11, 30, 23 and 60, reference is made here to the above statements.

As the security element 1 in FIG. 13*a* and FIG. 13*b* contains no orientation layers, the liquid crystals 12 and thus also the rod-shaped dye elements 13 have an isotropic orientation in the de-energized state, i.e. the rod-shaped dye elements 13 have no uniform direction and are thus arranged randomly. In this state the layer 11 that is electrically alterable in its optical effect appears opaque in a color determined by the rod-shaped dye molecules 13.

If on the other hand a voltage is applied to the electrode layers 30, 31, the liquid crystals 12 and correspondingly the rod-shaped dye molecules 13 become oriented, as described above, parallel to the electric field and the absorption of the rod-shaped dye molecules 13, as described above, is minimal. The layer 11 that is electrically alterable in its optical effect appears in a transparent state.

Figure 14:
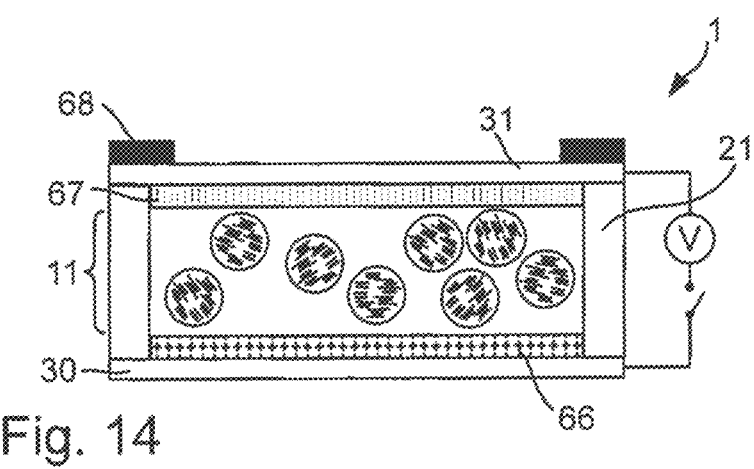
FIG. 14 shows a schematic sectional representation of a security element

FIG. 14 shows a further preferred embodiment example of a security element 1 according to the invention, which has the optional color layers 66 and 67. With respect to the layers 30, 31, 21, 11 and 68, reference is made here to the above statements.

The color layers 66, 67 here at least partially overlap the layer 11 that is electrically alterable in its optical effect. Furthermore, at least a part of the layer 11 that is electrically alterable in its optical effect is arranged between the color layers 66, 67. Furthermore, it is possible for the color layers to be colored differently, thus for example the color layer 66 can be colored green and the color layer 67 can be colored red. Furthermore, it is possible for the color layers 66, 67 to form a pattern with differently colored pattern elements. Thus, for example, the color layer 67 can have a pattern in the form of an image, such as for example a star, wherein the color layer 67 is colored blue in the region of the star.

FIG. 15*a* to FIG. 15*f* show top views of security elements 1 to illustrate the optical effect of the security elements according to the invention. FIG. 15*a*, FIG. 15*c* and FIG. 15*e* each show top views of the security elements 1 in the opaque state of the layer 11 that is electrically alterable in its optical effect. FIG. 15*b*, FIG. 15*d* and FIG. 15*f* show the top views of the security elements 1 in the transparent state of the layer 11 that is electrically alterable in its optical effect. Thus the security elements of FIG. 15*a* to FIG. 15*f* are formed in such a way that, in the opaque state of the layer that is electrically alterable in its optical effect, these all have a milky, cloudy and simultaneously colored appearance to an observer. In contrast, in the transparent state of the layer that is electrically alterable in its optical effect, additional color effects are however recognizable to the observer, as shown in FIG. 15*b*, FIG. 15*d* and FIG. 15*f*. In the opaque state of FIGS. 15*a*, 15*c*, 15*e*, these additional color effects are at best dimly recognizable or not recognizable at all. Thus for example the security element 1 of FIG. 15*b* in the regions 38, 39 and 40 shows different color effects which, as described above, are produced by different microstructures which the first electrode layer has. Thus it is for example possible for the region 39 to appear red to an observer, for the region 38 to appear blue to an observer and for the region 40 to have a hologram which, in the opaque state, remains hidden from an observer. FIG. 15*d* shows a security element 1 which has a frame 22 which forms the letter "K", wherein the region 41 of the letter "K" appears red to an observer, the region 42 appears blue to an observer and the region 43 is transparent. In contrast, the frame 22 appears dark or black and even in the opaque state is to be recognized as a darker region, as represented in FIG. 15*c*. FIG. 15*f* shows a security element 1 which represents fruits in the regions 45, 46 and leaves in the regions 44, 47. In the regions 44, 45, 46 and 47, different optical effects are here for example produced for an observer, as the lower electrode layer of the security element 1 has different microstructures these regions.

Figure 16A:
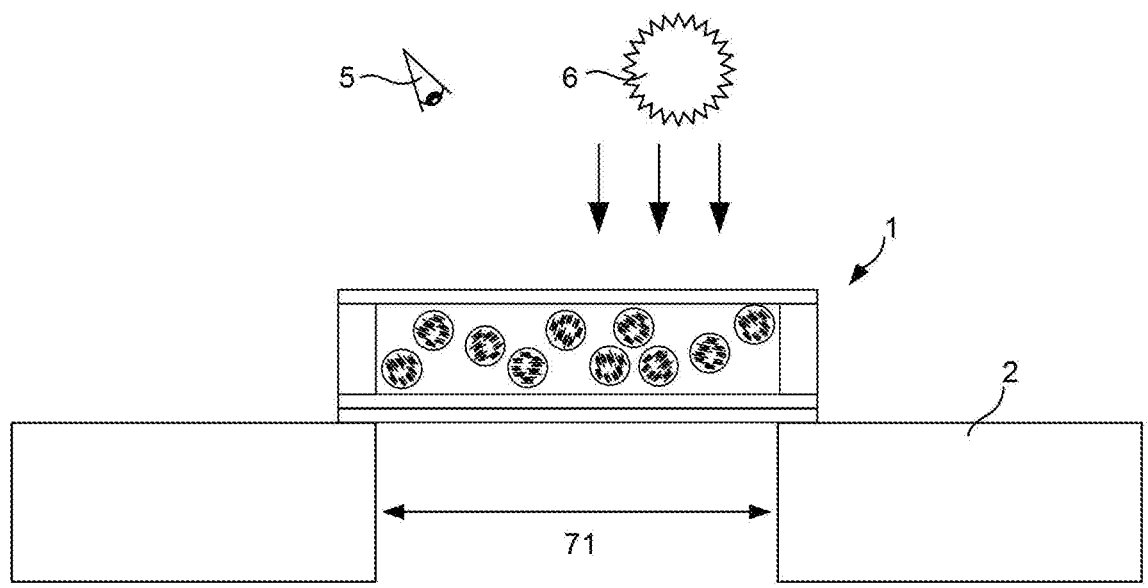
FIG. 16a and FIG. 16b show a schematic sectional representation of a security document
Figure 16B:
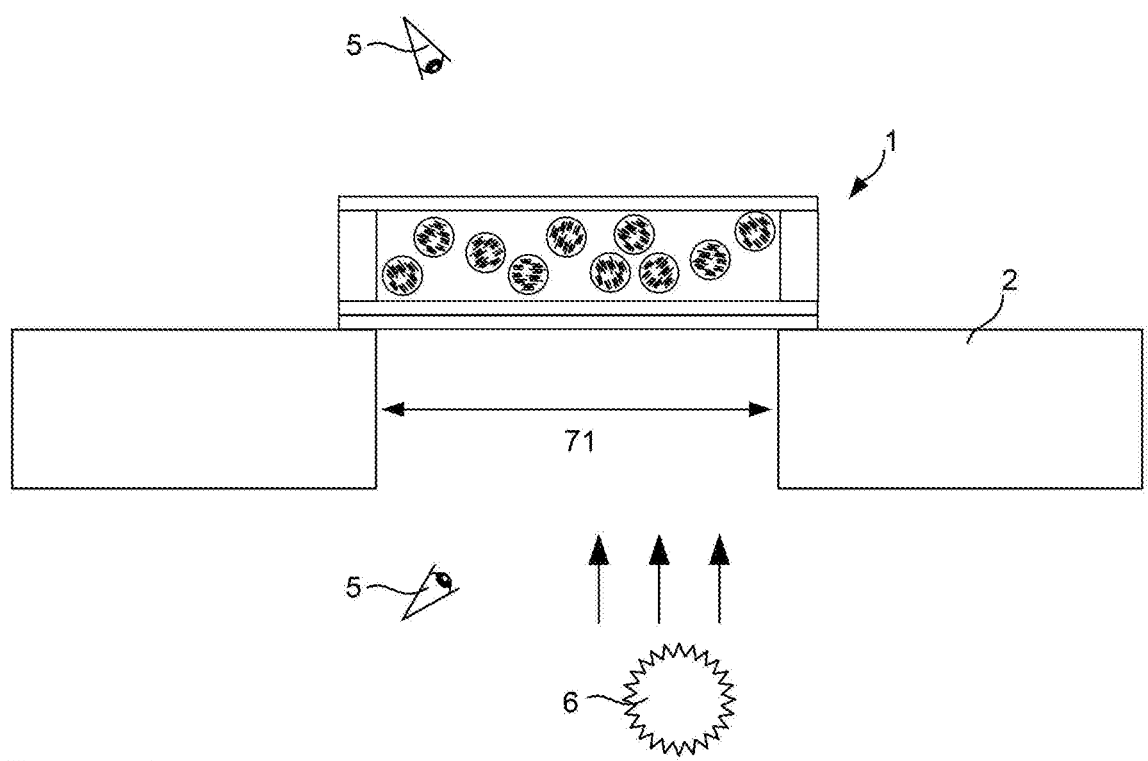

FIG. 16*a* and FIG. 16*b* show a further embodiment example in which a security element 1 is arranged over a window 71 preferably completely penetrating the substrate of a security document 2. In this way the security document 1 can be observed from both sides, both in reflected light and in transmitted light. The security document 2 can for example be a banknote. The window 71 can for example be a hole punched out of a paper banknote or a page in a passport. It is possible for an observer 5 to observe the security document 2 and the security element 1 applied to the security document 2 both in reflected light and in transmitted light from the front of the security document 2 or both in reflected light and in transmitted light from the back of the security document 2, as shown in FIGS. 16*a* and 16*b*.

Figure 17:
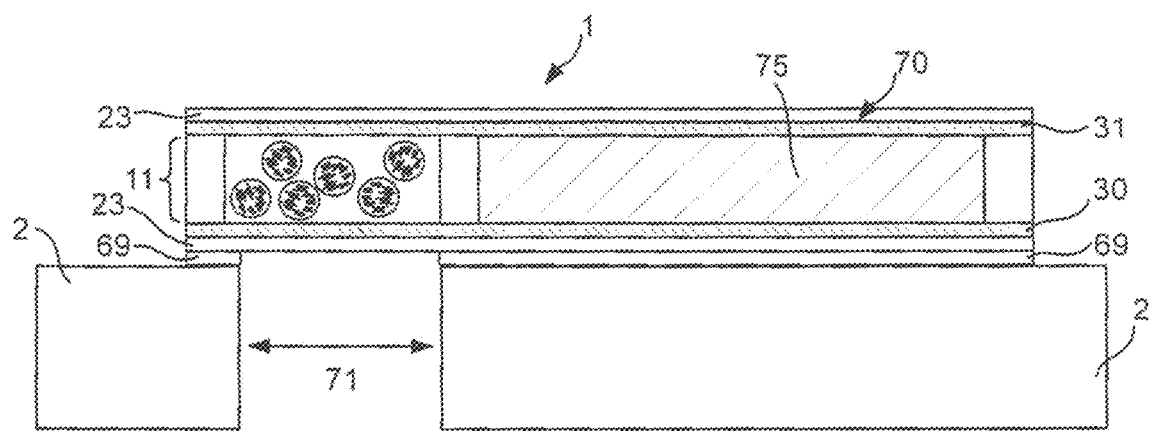
FIG. 17 shows a schematic sectional representation of a security document

FIG. 17 shows a security document 2, e.g. a paper banknote, in which a window opening 71 is formed, e.g. by stamping, which preferably completely penetrates the paper substrate of the security document 2. The security document 2 has a thickness of at most 1000 µm, in particular a thickness in the range of from 20 to 200 µm, here preferably in the range of from 50 to 140 µm.

A security element 1 which comprises a piezoelectric energy source 70 is fixed to one side of the security document 2, e.g. by means of an adhesive layer 69. The layer 11 that is electrically alterable in its optical effect of the security element 1 is arranged in such a way that it closes the window opening 71. The piezoelectric energy source 70 contains a layer 75 of piezoelectric material, e.g. PVDF (=polyvinylidene fluoride), against each of the two sides of which an electrode layer 30, 31 rests.

The electrode layers 30, 31 have a layer thickness in the range of from 1 nm to 500 nm, preferably in the range of from 10 nm to 200 nm. The electrode layers 30, 31 can be formed opaque or at least locally transparent. Metals or metal alloys such as aluminum, silver, gold, chromium, copper and the like, conductive non-metallic inorganic materials such as ITO and the like, carbon nanotubes, graphene and conductive polymers such as PEDOT (=poly (3,4-ethylene dioxythiophene)), PANI (=polyaniline) and the like have proved successful for forming the electrode layers 30, 31.

The formation of the electrode layers 30, 31 takes place in particular during formation of metallic or non-metallic inorganic electrode layers 30, 31 preferably by vapor deposition or sputtering, or in particular during the formation of polymeric electrode layers 30, 31 by usual printing processes such as screen printing, inkjet printing, relief printing, intaglio printing or using a doctor blade. However, the use of a transfer foil for forming electrode layers 30, 31 by means of hot or cold stamping is also possible.

These electrode layers 30, 31 form an electrically conductive connection through the security element 1 up to the layer 11 that is electrically alterable in its optical effect.

The security element 1 is covered with a transparent auxiliary layer 23 towards the outsides. The auxiliary layer 23 is preferably a protective layer. The protective layer is preferably formed as a carrier film which is self-supporting or formed as a protective varnish layer which is not self-supporting because of its small layer thickness. The protective layer is preferably formed transparent without color or with color. The protective layer is in particular formed from PET, PEN (=polyethylene naphthalate), PE (=polyethylene), PI=(polyimide), PP (=polypropylene), PC or PTFE (=polytetrafluoroethylene). Furthermore, it is possible for the auxiliary layer 23 to be a height-compensating leveling layer which is applied in particular between security element 1 and security document 2.

It has proved successful if a polymer, in particular of the polyvinylidene fluoride (=PVDF) type, is used as piezoelectric material. However, other piezoelectric materials such as polyamides, polyurethanes, fluoropolymers and in particular copolymers derived therefrom, as well as ferroelectric liquid crystal elastomers can also be used. Further possible piezoelectric materials are printable composite materials made of piezoelectric particles e.g. of lead zirconate titanate (PZT) or zinc oxide (ZnO), embedded in an organic matrix, or also inorganic piezoelectric materials such as PZT layers or ZnO nanowire arrays which are transferred onto a flexible carrier material, e.g. via laser lift-off. The layer 75 of piezoelectric material preferably has a layer thickness of at most 200 μm, preferably of at most 50 μm, further preferably at most 25 μm. For ID documents such as a polycarbonate (PC) passport card, layer thicknesses in the range up to 200 μm, preferably up to 100 μm have proved practical. Such thin layers of piezoelectric material can be produced in particular by printing in one or more passes, wherein the ability to produce an electric voltage when a bending load is applied is surprisingly retained if there is a suitable stiffness.

It is particularly preferred if the layer 11 that is electrically alterable in its optical effect becomes transparent or opaque under the action of the electric field which is produced by the piezoelectric energy source 70 by bending thereof between the first and the second electrode layers 30, 31. However, the energy source 70 can be activated not only by bending, but also thermally via a temperature gradient which is applied over the layer 75 of piezoelectric material.

By the activation of the energy source 70, changing optical effects can be brought about in the security element 1, as described above. The reading of these items of optical information takes place in particular visually and without further aids.

Figure 18:
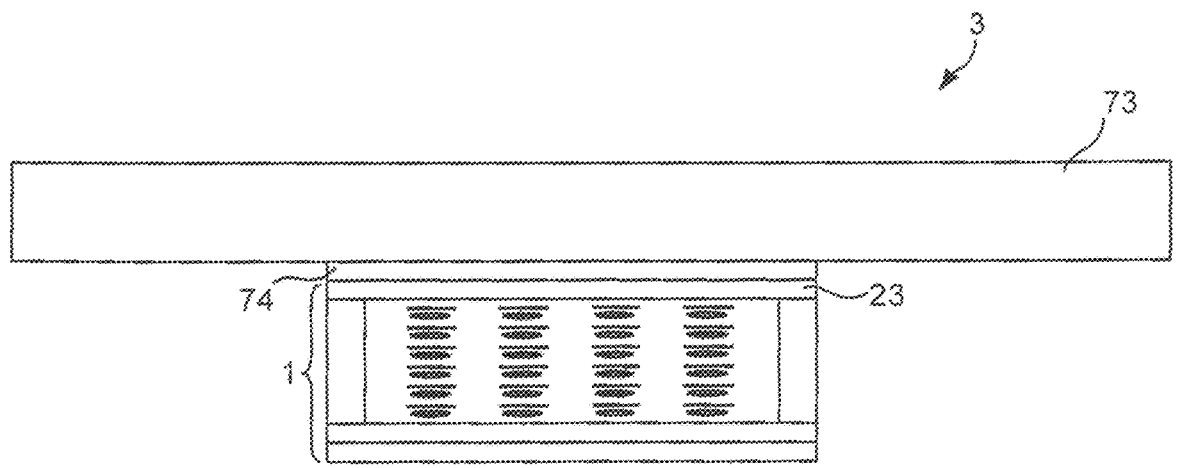
FIG. 18 shows a schematic sectional representation of a transfer foil

FIG. 18 shows a transfer foil 3. It has proved successful if the security element 1 is provided on a transfer foil 73, with the result that an application of the security element 1 to a security document 2 can take place by means of stamping. Such a transfer foil 3 has at least one security element 1 according to the invention, wherein the at least one security element 1 is arranged on a carrier film 73 of the transfer foil 3 and can be detached therefrom.

Starting from the carrier film 73 of the transfer foil 3, a detachment layer 74 is usually present here, in order to be able to detach the security element 1 from the carrier film 73 of the transfer foil 3 after stamping. On a side of the detachment layer 74 facing away from the carrier film 73 of the transfer foil 3, the optional transparent protective layer 23 formed as protective varnish layer and, furthermore, the remaining structure of the security element 1 are preferably present.

The security element 1 can be fixed to the security document 2 by means of an adhesive layer 69, in particular made of a cold or hot-melt adhesive. However, the adhesive layer 69 can also already be formed by a carrier film which adjoins the security element 1.

LIST OF REFERENCE NUMBERS

1 Security element
2 Security document
3 Transfer foil
5 Observer
6 Light source
11 Layer that is electrically alterable in its optical effect
12 Liquid crystals
13 Rod-shaped dye molecules
14, 15 Axes of the rod-shaped dye molecules
17, 16 Axes of the liquid crystals
19 Spheres
21 Support layer
22 Frame
23 Auxiliary layer
26, 27 Zones
30, 31, 30m, 31m Electrode layers
37, 33, 35, 36, 55, 56, 57, 58 Regions
24, 38, 39, 40, 41, 42, 43 Partial regions
50, 51, 50r Orientation layers
60 Reflective layer
63, 64 Polarizer layers
66, 67 Color filter layers
68 Effect layer
69 Adhesive layer
70 Energy source
71 Window
73 Carrier film
74 Detachment layer
75 Layer of piezoelectric material

The invention claimed is:

1. A security element for marking a security document with an upper side and an underside, wherein the security element has at least one layer that is electrically alterable in its optical effect, wherein the at least one layer that is electrically alterable in its optical effect has liquid crystals that can be oriented in an electric field, wherein
   a) the at least one layer that is electrically alterable in its optical effect further has rod-shaped dye molecules, and the orientations of the longitudinal axes of the rod-shaped dye molecules are alterable depending on the orientations of the longitudinal axes of the spatially adjacent liquid crystals that can be oriented in the electric field, and/or
   b) the liquid crystals that can be oriented in the electric field are formed with different absorption coefficients for different molecular axes such that the liquid crystals that can be oriented in the electric field simultaneously act as dye molecules, and
wherein the security element has an electrically insulating support layer, the support layer forming a frame and one or more partition walls disposed within the frame, the frame bounding the at least one layer that is electrically alterable in its optical effect, and the one or more partition walls being present in one or more first zones and not present in one or more second zones, wherein the support layer in the one or more first zones has a height of between 1 μm and 50 μm, and
wherein the distance between the one or more first zones is between 5 μm and 500 μm, and
wherein the partition walls are formed patterned for representing a first item of information, and
wherein the security element has a first electrode layer and a second electrode layer between which at least a part of the at least one layer that is electrically alterable in its optical effect is arranged, and wherein the height of the frame and the partition walls of the support layer extends from the first electrode layer to the second electrode layer.

2. The security element according to claim 1, wherein the rod-shaped dye molecules are soluble, non-ionic, chemically, photochemically and/or electrochemically stable dye molecules.

3. The security element according to claim 1, wherein the rod-shaped dye molecules are conjugated dye molecules.

4. The security element according to claim 3, wherein the rod-shaped, conjugated dye molecules have one or more nitrogen atoms or one or more oxygen atoms.

5. The security element according to claim 1, wherein the rod-shaped dye molecules have at least one molecule comprising an anthraquinone dye and/or an azo dye.

6. The security element according to claim 1, wherein the concentration of the rod-shaped dye molecules in the at least one layer that is electrically alterable in its optical effect is between 0.05 percent by weight and 4 percent by weight.

7. The security element according to claim 1, wherein the rod-shaped dye molecules absorb light in a wavelength range of from 380 nm to 780 nm, which strikes the longitudinal axis of the rod-shaped dye molecules perpendicularly more strongly than light which strikes parallel to the longitudinal axis of the rod-shaped dye molecules.

8. The security element according to claim 1, wherein the frame forms a visually recognizable design element.

9. The security element according to claim 1, wherein the support layer has one or more dyes and/or pigments.

10. The security element according to claim 1, wherein the one or more first zones are arranged according to a one-dimensional or two-dimensional grid.

11. The security element according to claim 1, wherein the first electrode layer and/or the second electrode layer is provided in a first region and not provided in a second region, wherein the first region is formed patterned for representing a second item of information.

12. The security element according to claim 1, wherein the first electrode layer and/or the second electrode layer is/are transparent or semi-transparent.

13. The security element according to claim 1, wherein the first electrode layer has first microstructures in at least one third region.

14. The security element according to claim 13, wherein the at least one third region has one or more partial regions, into which at least two first microstructures producing different color effects, are molded.

15. The security element according to claim 13, wherein the first microstructures produce at least one color effect in the range of the wavelengths of from 380 nm to 780 nm.

16. The security element according to claim 1, wherein the first electrode layer has first microstructures in the one or more second zones in which the support layer is not present.

17. The security element according to claim 13, wherein the first microstructures are first diffractive relief structures and/or binary microstructures.

18. The security element according to claim 17, wherein the first diffractive relief structures are selected from the group of Kinegram®, holograms, zero-order diffraction structures, blazed gratings, asymmetrical saw-tooth relief structures, diffraction structures, linear sinusoidal diffraction gratings or crossed sinusoidal diffraction gratings, or linear single- or multi-step rectangular gratings or crossed single- or multi-step rectangular gratings, mirror surfaces, mat structures, anisotropic or isotropic mat structures, or combinations of these structures.

19. The security element according to claim 17, wherein the binary microstructures comprise a base surface parallel to the plane spanned by the underside of the security element and several first elements, wherein first element surfaces of the first elements in each case run substantially parallel to the base plane and wherein the first element surfaces of the first elements and the base surface are spaced apart in a direction running perpendicular to the underside of the security element by a first distance which is selected such that a color is generated by means of interference of the light reflected on the base surface and the first element surfaces in reflected light and/or by means of interference of the light transmitted through the first element surfaces and the base surfaces in transmitted light, or wherein the binary microstructures comprise a multitude of second elements adjacent to each other, wherein second element surfaces of the second elements are arranged parallel to each other and the second elements each have an edge adjacent to the respective second element surface, wherein the second element surfaces of adjacent second elements are spaced apart in a direction perpendicular to the second element surfaces by a second distance, wherein the second distance is between 150 nm and 1500 nm.

20. The security element according to claim 1, wherein the second electrode layer has second microstructures in at least one fourth region selected from the group of Kinegram® or holograms, zero-order diffraction structures, blazed gratings, asymmetrical saw-tooth relief structures, diffraction structures, linear sinusoidal diffraction gratings or crossed sinusoidal diffraction gratings, or linear single- or multi-step rectangular gratings or crossed single- or multi-step rectangular gratings, light-diffracting and/or light-refracting and/or light-focusing micro- or nanostructures, binary or continuous Fresnel lenses, binary or continuous Fresnel freeform surfaces, diffractive or refractive macrostructures, lens structures or microprism structures, mirror surfaces, mat structures, anisotropic or isotropic mat structures, or combinations of these structures.

21. The security element according to claim 1, wherein the at least one layer that is electrically alterable in its optical effect has a multitude of spheres which contain the liquid crystals and the rod-shaped dye molecules.

22. The security element according to claim 1, wherein the at least one layer that is electrically alterable in its optical effect is arranged between a first orientation layer with a first preferred direction and a second orientation layer with a second preferred direction.

23. The security element according to claim 22, wherein the liquid crystals that can be oriented in the electric field are cholesteric liquid crystals.

24. The security element according to claim 22, wherein the second preferred direction of the second orientation layer is rotated with respect to the first preferred direction of the first orientation layer by 45° or 90°.

25. The security element according to claim 22, wherein the second preferred direction of the second orientation layer and the first preferred direction of the first orientation layer have the same orientation.

26. The security element according to claim 22, wherein the first orientation layer and/or the second orientation layer have a third diffractive relief structure.

27. The security element according to claim 26, wherein the first orientation layer and/or the second orientation layer has the third diffractive relief structure in at least one fifth region and a fourth diffractive relief structure in at least one sixth region, wherein the third diffractive relief structure and the fourth diffractive relief structure differ in at least one of the parameters azimuth angle, grating period or grating depth.

28. The security element according to claim 27, wherein the third diffractive relief structure and/or the fourth diffractive relief structure is a high-frequency, sinusoidal, relief structure with a grating period of between 190 nm and 500 nm, and a grating depth of from 50 nm to 500 nm.

29. The security element according to claim 1, wherein the security element has a reflective layer.

30. The security element according to claim 1, wherein the security element has at least one first polarizer layer.

31. The security element according to claim 30, wherein the security element has a second polarizer layer, wherein at least a part of the at least one layer that is electrically alterable in its optical effect is arranged between the at least one first polarizer layer and the second polarizer layer.

32. The security element according to claim 31, wherein the at least one first polarizer layer and/or the one second polarizer layer is a layer of semi-crystalline polymer.

33. The security element according to claim 31, wherein the at least one first polarizer layer and/or the one second polarizer layer has a layer thickness of between 5 µm and 15 µm.

34. The security element according to claim 1, wherein the security element has at least one first color filter layer, wherein the at least one layer that is electrically alterable in its optical effect and the at least one first color filter layer at least partially overlap with each other.

35. The security element according to claim 1, wherein the security element has at least one effect layer which influences the optical appearance of the security element.

36. The security element according to claim 35, wherein the at least one effect layer is an optically variable layer, which has a binder and optically variable pigments.

37. The security element according to claim 1, wherein the security element perpendicular to the plane spanned by the underside of the security element has a thickness of at most 100 µm.

38. The security element according to claim 1, wherein the security element has at least one energy source controlling the at least one layer that is electrically alterable in its optical effect.

39. The security element according to claim 1, wherein the liquid crystals that can be oriented in the electric field are oligomer molecules comprising oligo(p-phenylene-vinylene) (OPV).

40. The security element according to claim 39, wherein the oligomer molecules comprise at least two phenylene-vinylene building blocks and a maximum of ten phenylene-vinylene building blocks.

41. The security element according to claim 40, wherein the oligomer molecules comprise only five phenylene-vinylene building blocks (pentamers).

42. The security element according to claim 1, wherein the one or more partition walls separate the at least one layer that is electrically alterable in its optical effect into a plurality of second zones.

43. A security document, in particular a banknote or an ID document, with at least one security element according to claim 1.

44. The security document according to claim 43, wherein the security element is arranged at least in regions in a transparent region of the security document and/or a window of the security document.

45. A transfer foil with at least one security element according to claim 1, wherein the at least one security element is detachably arranged on a carrier film of the transfer foil.

46. A method for producing a security element, comprising: providing the security element of claim 1, wherein the at least one layer that is electrically alterable in its optical effect is formed by printing onto a carrier film or onto a layer or layer stack applied to a carrier film.

* * * * *